United States Patent [19]

Ishihara et al.

[11] Patent Number: 5,448,379
[45] Date of Patent: Sep. 5, 1995

[54] METHOD AND APPARATUS FOR FORMING COLOR IMAGES BY CONVERTING A COLOR SIGNAL TO A FURTHER COLOR DENSITY SIGNAL

[75] Inventors: Hideshi Ishihara, Katano; Haruo Yamashita, Osaka; Yasuki Matsumoto, Takarazuka, all of Japan

[73] Assignee: Matsushita Electric Industrial Co., Ltd., Kadoma, Japan

[21] Appl. No.: 77,930

[22] Filed: Jun. 18, 1993

[30] Foreign Application Priority Data

Jun. 19, 1992 [JP] Japan .................................. 4-160757
Nov. 25, 1992 [JP] Japan .................................. 4-313849

[51] Int. Cl.$^6$ .......................... G03F 3/08; H04N 1/46
[52] U.S. Cl. .................... 358/518; 358/523; 358/515; 358/504
[58] Field of Search ............... 358/500, 518, 517, 523, 358/525, 515, 504

[56] References Cited

U.S. PATENT DOCUMENTS

| | | | |
|---|---|---|---|
| 4,328,515 | 5/1982 | Wellendorf | 358/518 |
| 4,959,711 | 9/1990 | Hung | 358/523 |
| 5,107,332 | 4/1992 | Chan | 358/80 |
| 5,142,356 | 8/1992 | Usami | 358/500 |

FOREIGN PATENT DOCUMENTS 63-151263 6/1988 Japan .
4-181870 6/1992 Japan .

*Primary Examiner*—Edward L. Coles, Sr.
*Assistant Examiner*—Allan A. Esposo
*Attorney, Agent, or Firm*—Willian Brinks Hofer Gilson & Lione

[57] ABSTRACT

Method and apparatus for forming color images on paper using a sublimation type thermal transfer full-color printer using three color inks of yellow, magenta, and cyan. A color input signal to be printed is subjected to a first color correction process. The first color correction process performs a color correction using linear and non-linear masking operations and produces first ink-density signals. The first ink-density signals are judged for reproducibility by the printer by determining whether the signals fit within a gamut of colors. If judged to be reproducible, the first ink-density signals are passed on to the printer. However, if the first ink-density signals are judged to be outside the gamut of colors, the signals are subjected to a second correction process. The second color correction process first obtains a target color for color reproduction by the printer. Next, the second process sets ink-density signals, obtains predicted colors realized by the ink-density signals, chooses an output ink-density signal such that an evaluation value calculated by the target color and the predicted color becomes minimal, and produces a second ink-density signal that results in optimal colors within the range of colors reproducible by the printer.

7 Claims, 17 Drawing Sheets

Fig. 4(a)
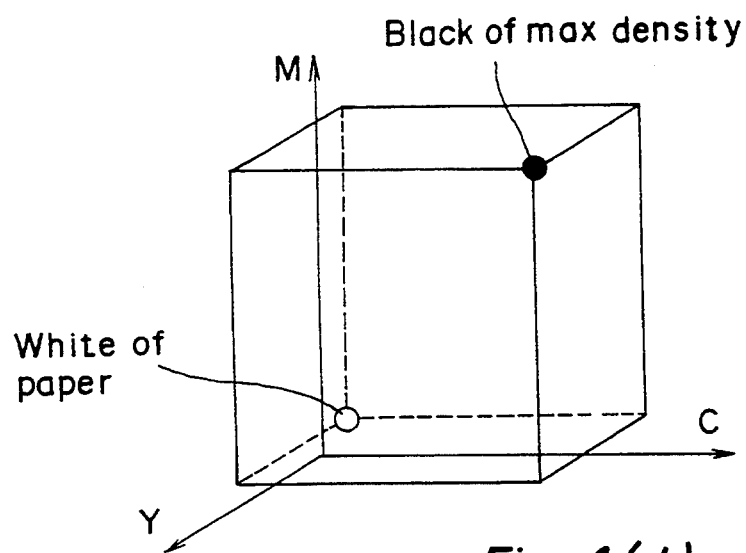
Fig. 4(b)
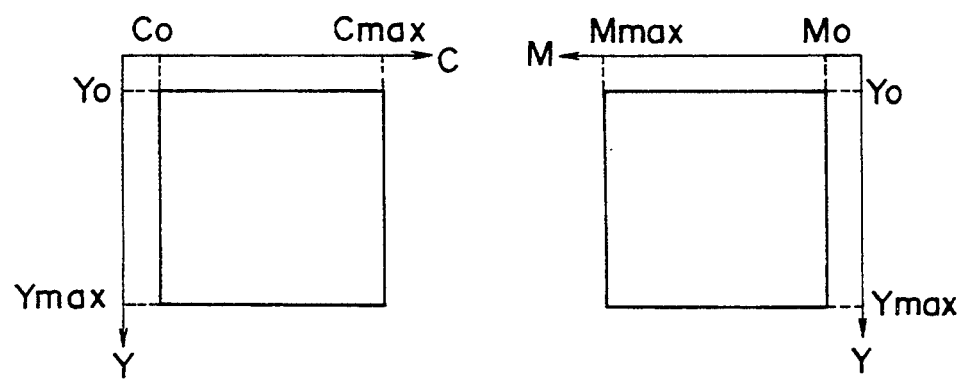
Fig. 4(d)
Fig. 4(c)
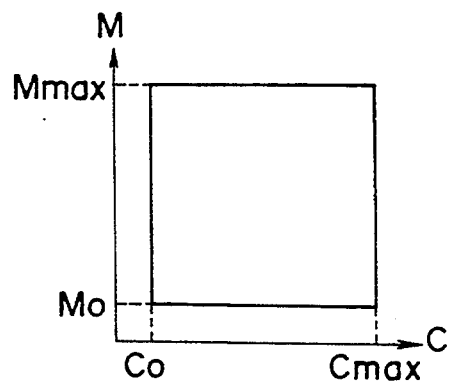

○ Equal weight evaluation func.

● Hue-emphasized evaluation func.

◐ Brightness-emphasized evaluation func.

Fig. 15 (a) yellow ink

Fig. 15 (b) Magenta ink

Fig. 15 (c) Cyan ink

Reflectance (%)

Wavelength (nm)

METHOD AND APPARATUS FOR FORMING COLOR IMAGES BY CONVERTING A COLOR SIGNAL TO A FURTHER COLOR DENSITY SIGNAL

BACKGROUND OF THE INVENTION

1. Field of the Invention

The present invention relates to method and apparatus for forming color images on paper with color inks by color printer, color copy machine or the like.

2. Description of the Related Art

In color CRTs (cathode ray tubes), which are widely used for color television sets, computer monitors and the like, color reproduction is made by controlling the luminances of the primary colors of colored light, red (R), green (G), and blue (B), based on the principle of additive color mixture. On the other hand, color reproduction in hard copying such as by color printer or color copy machine is made by controlling reflectances of colored lights with color inks of cyan (C), magenta (M), and yellow (Y), which are complementary colors of the primaries of colored light, based on the principle of subtractive color mixture.

However, the spectral absorption characteristic of a color ink is broad, as shown in FIGS. 15($a$), 15($b$) and 15($c$) which show the spectral absorption characteristics of inks used in a sublimation type thermal transfer printer, and each ink absorbs unnecessary components other than the complementary colors of its reflected light, so that it does not function as an ideal absorption filter. Therefore, processing called color correction is performed to reproduce desired colors.

A method called masking has been employed for color correction in hard copying. Among the masking methods, most often used is a method called linear masking, which determines an ink-density signal (Y, M, C) by applying a linear operation to a primary color density signal ($D_R$, $D_G$, $D_B$), which expresses the densities of complementary colors of a primary color signal (R, G, B), as shown in the following (1).

$$\begin{bmatrix} C \\ M \\ Y \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} D_R \\ D_G \\ D_B \end{bmatrix} \quad (1)$$

The linear masking assumes that the additive law of densities (Lambert-Beer law) holds in color reproduction that uses real inks and that color reproduction is realized by a linear operation in a whole color space. However, it is known that in color reproduction that uses real inks, eg. by a sublimation type thermal transfer printer, the additive and proportional laws do not hold owing to various nonlinear factors such as resublimation of inks and internal reflection of inks.

Therefore, there has been proposed a nonlinear masking method that determines the density signal (Y, M, C) of inks by a high-degree polynomial. Following is the formula for quadratic masking, which is the simplest nonlinear masking.

$$C = a_0 D_R + a_1 D_g + a_2 D_B + a_3 D_R^2 + a_4 D_G^2 + a_5 D_B^2 + a_6 D_R D_G + a_7 D_G D_B + a_8 D_B D_R \quad (2)$$

$$M = a_9 D_R + a_{10} D_g + a_{11} D_B + a_{12} D_R^2 + a_{13} D_G^2 + a_{14} D_B^2 + a_{15} D_R D_G + a_{16} D_G D_B + a_{17} D_B D_R$$

$$M = a_{18} D_R + a_{19} D_g + a_{20} D_B + a_{21} D_R^2 + a_{22} D_G^2 + a_{23} D_B^2 + a_{24} D_R D_G + a_{25} D_G D_B + a_{26} D_B D_R$$

The quadratic masking performs color correction by the quadratic equations incorporating nonlinear factors in color reproduction, and the 27 correction coefficients $a_0$ to $a_{26}$ are determined by the least square method with respect to differences of color densities. (See for example, Image processing for color reproduction, Imaging Part 1, Shashin Kogyo Bessatsu).

Further, color reproduction for hard copying has a problem of the reproducible color gamut. The range of densities realized by a color printer is limited to the maximum printing density inherent to each printer and the density of the paper used for reproduction. Owing to this limitation on the printable densities and the existence of unnecessarily absorbed components, the range of reproducible colors is limited, so that the color gamut reproducible by a color printer is generally smaller than that by a CRT, which employs the principle of additive color mixture.

FIG. 16 shows the color gamuts reproducible by a CRT and a color printer in the perceptually uniform CIE L*u*v* color space. FIG. 16 ($a$) shows the projection of the color reproduction gamuts on the u*v* plane, FIG. 16 ($b$) shows the projection on the L*u* plane, and FIG. 16 ($c$) shows the projection on the L*v* plane In FIG. 16, the color reproduction range of a printer is of the printer whose spectral absorption characteristics are shown in FIG. 15, and the color reproduction gamut of a CRT is of a CRT in the NTSC system.

Since the color reproduction gamut of a printer is smaller than that of a CRT in this way, a signal that requests a color outside the color reproduction gamut of a printer is sometimes input to the printer. This case happens when at least one of the density values (Y, M, C) determined by linear masking or nonlinear masking described above is less than the density of the paper or greater than the maximum density of the printer. Prior arts have performed printing for this unreproduceable ink density using limiters that set the density value to the density of the paper if a density less than the density of the paper is requested and sets the value to the density of the maximum density of the printer if a density greater than the maximum density of the printer is requested.

However, since a density signal of inks and colors people perceive are in nonlinear relations, the limiters for an ink-density signal do not provide optimal adjustment. FIG. 17 shows examples of color reproduction when limiters are used for an ink-density signal obtained by a masking operation. In FIG. 17, $P_i$, i=1, 2, 3, are desired colors indicated by input signals, and $Q_i$, i=1, 2, 3, are the corresponding colors indicated by the limiters.

Alternatively, there has been proposed a color correction circuit comprising means for performing a primary correction operation for correcting an output signal (ink density signals) to have a proportional relationship with an input signal (primary color density signals), means for performing a secondary correction operation for minimizing a difference between the density of an input image and that of an output image using the least square method and means for selecting the result obtained by the secondary correction operation if a difference between the result and the input signal is smaller than a predetermined value and, if not, the result obtained by the primary correction operation (See JP-A SHO 63-151263).

Also, there has been proposed a color image processing apparatus in which there is provided a look-up table storing data for judging whether or not an input signal is within the color gamut reproducible by the output apparatus and, if judged that the input signal is within the color gamut, by referring to the look-up table, outputs from a density conversion table are selected and, if judged that it is out of the color gamut, outputs from logarithmic conversion circuit and masking circuit (See JP-A HEI 4-181870).

Thus, according to these prior arts, the ink density signals are determined by a masking operation when the input signal is out of the color gamut reproducible by a printer.

However, since the color gamut of the input signal is wider than that reproducible by a printer, results obtained by masking operation to the input signal out of the color reproduction gamut of the printer contains ink density signals impossible to reproduce by the printer and, therefore, necessitating to subject them to limiting operation.

It is considerable to set correction coefficients for the masking operation so that the ink density signals reproducible by the printer may be obtained even to the input signal out of the color gamut reproducible by the printer. However, in this method, a very large compression of a color space is performed by the masking operation and, therefore, color reproduction may be made using colors very different from input colors resulting in an unnatural color reproduction.

As shown in the above examples, when desired colors corresponding to an input color signal are outside the color gamut reproducible by a printer, prior arts sometimes perform color reproduction using greatly different colors from the ones that people feel to be better, even the better colors exist within the color gamut reproducible by the printer.

SUMMARY OF THE INVENTION

The object of the present invention is therefore to provide a method and apparatus of forming color images of which people do not feel the degradation of image quality by performing color reproduction using optimal colors within the range of colors reproducible by a printer, if a color signal that can not be realized by the printer is given.

In order to achieve the aforementioned objective, the method of forming color images in accordance with the present invention comprises a first color correction process that performs optimal color correction for colors reproducible by a printer and converts an input color signal into a first color density signal (Y1, M1, C1), a judgment process that judges whether the input signal indicate a color reproducible by the printer, a second color correction process that converts the input signal judged to indicate a color unreproduceable by the printer in the judgment process into a second color density signal (Y2, M2, C2) that produce an optimal color within the range of colors reproducible by the printer. The method then controls ink densities and forms color images following the judgment process, using the first color density signal (Y1, M1, C1) if the input signal indicates a color reproducible by the printer, and using the second color density signal (Y2, M2, C2) if the input signal indicates a color unreproduceable by the printer.

It is to be noted that the term "color density signal" indicates a signal for controlling densities of yellow, magenta and cyan materials used in a color image forming apparatus. Namely, it indicates an color density signal in the case that yellow, magenta and cyan inks are used and, in the case that yellow, magenta and cyan toners are used, it indicates a toner-density signal.

Further, in order to achieve the aforementioned objective, the apparatus of forming color images in accordance with the present invention converts a representative point indicated by upper bits of each input signal into a first color density signal (Y1, M1, C1) by a first color correction operation that performs optimal color correction for colors reproducible by the printer, judges whether the representative point indicates a color reproducible by the printer, converts the representative point that indicates a color unreproduceable by the printer into a second color density signal (Y2, M2, C2) by a second color correction operation, and following the above judgment, determines the color density signal (Y3, M3, C3) of the above representative point to be the first color density signal (Y1, M1, C1) if the input signal indicates a color reproducible by the printer and determines the color density signals (Y3, M3, C3) of the above representative point to be the second color density signal (Y2, M2, C2) if the input signal indicates a color unreproduceable by the printer. The apparatus has a memory means composed of a ROM or RAM that stores the above color density signal (Y3, M3, C3), an address means that receives upper bits of the input signal to be printed and generates an address to be given to the above memory means, and an interpolation means that performs an interpolation operation using the color density signal (Y3, M3, C3) output from the above memory means and lower bits of the input signals to be printed and determines the color density signal (Y, M, C) corresponding to the input signal to be printed. Finally, the apparatus performs color printing using the color density signal (Y, M, C).

The method of forming color images in accordance with the present invention performs color reproduction using an optimal color for even an input signal that indicates a color unreproduceable by a printer, so that the method greatly improves image quality. This effect is due to the fact that the method uses the first color density signal for an input signal that indicates a color reproducible by a printer and uses the second color density signal for an input signal that indicates a color unreproduceable by a printer.

Further, the apparatus of forming color images in accordance with the present invention performs the determination of the color density signal by real-time processing even for an input signal that indicates a color unreproduceable by a printer. The apparatus performs color printing of a full color image having high image quality for input signals that indicate colors including those unreproduceable by a printer.

BRIEF DESCRIPTION OF THE DRAWINGS

These and other objects and features of the present invention will become clear from the following description taken in conjunction with the preferred embodiments thereof with reference to the accompanying drawings throughout which like parts are indicated by like reference numerals, and in which:

FIG. 4(a) shows a schematic color gamut reproducible by a printer in the ink-density space and FIGS. 4(b), 4(c) and 4(d) are projections of the color gamut on Y-C, C-M, and M-Y planes, respectively;

FIGS. 15(a), 15(b) and 15(c) show the spectral absorption characteristics of inks used in a sublimation type thermal transfer printer, respectively;

DETAILED DESCRIPTION OF THE PREFERRED EMBODIMENTS

The preferred embodiments according to the present invention will be described below with reference to the attached drawings.

In the following is described the method of forming color images in the first embodiment in accordance with the present invention. The first embodiment determines an ink-density signal (Y, M, C) by software for printing or reproducing color images by a printer based on a primary color luminance signal (R, G, B) that is used for a CRT. The first embodiment employs a sublimation type thermal transfer full-color printer using three color inks of yellow, magenta, and cyan.

Figure 2:
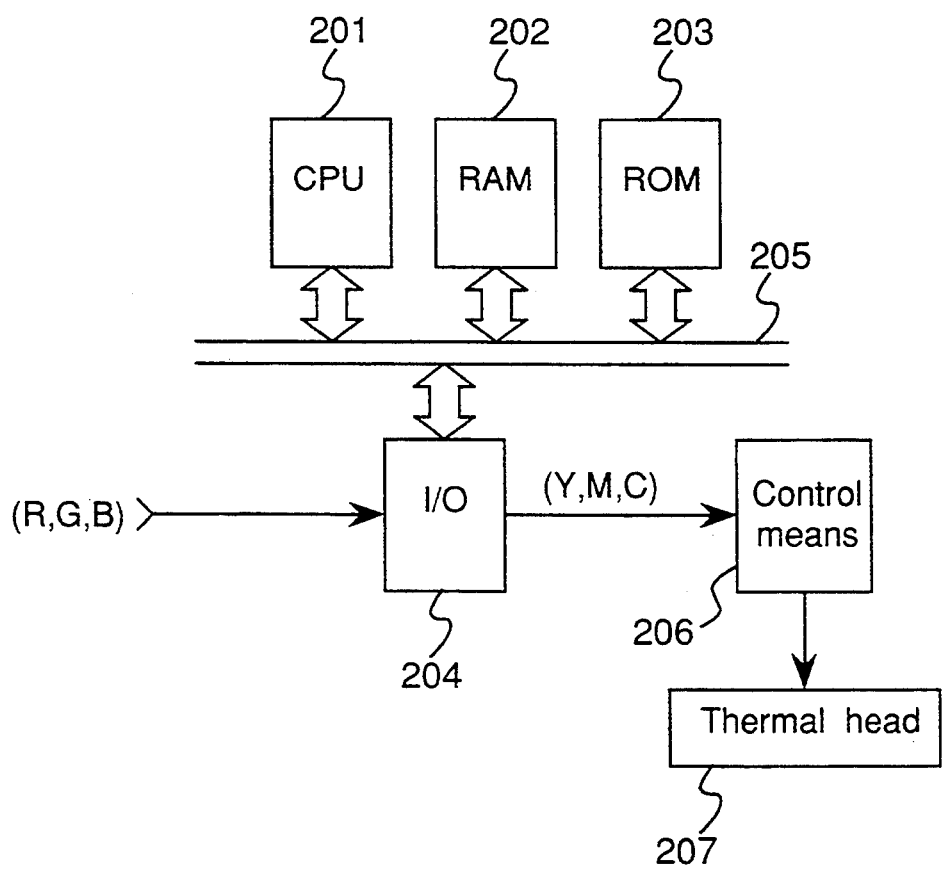
FIG. 2. shows a block diagram of an image forming apparatus used in the first embodiment.

A block diagram of an apparatus used in the first embodiment is shown in FIG. 2. In FIG. 2, reference numeral 201 denotes a CPU that performs the method forming color images in accordance with the present invention. 202 denotes a RAM that is used for a work area for CPU 201 in executing a program. 203 denotes a ROM that is used as storage for the program executed by CPU 201. 204 denotes an I/O means that reads input signals (R, G, B) to be printed and outputs ink-density signals (Y, M, C). 205 denotes a bus that connects each of CPU 201, RAM 202, ROM 203, and I/O means 204 with each other. 206 denotes a controller that controls impression energy based on the ink-density signal (Y, M, C) output from I/O means 204. 207 denotes a thermal head that impresses an ink sheet, which is not shown in FIG. 2, with the impression energy controlled by controller 206 and forms a full color image on an image-receiving sheet of paper, which is not shown in FIG. 2.

Figure 3:
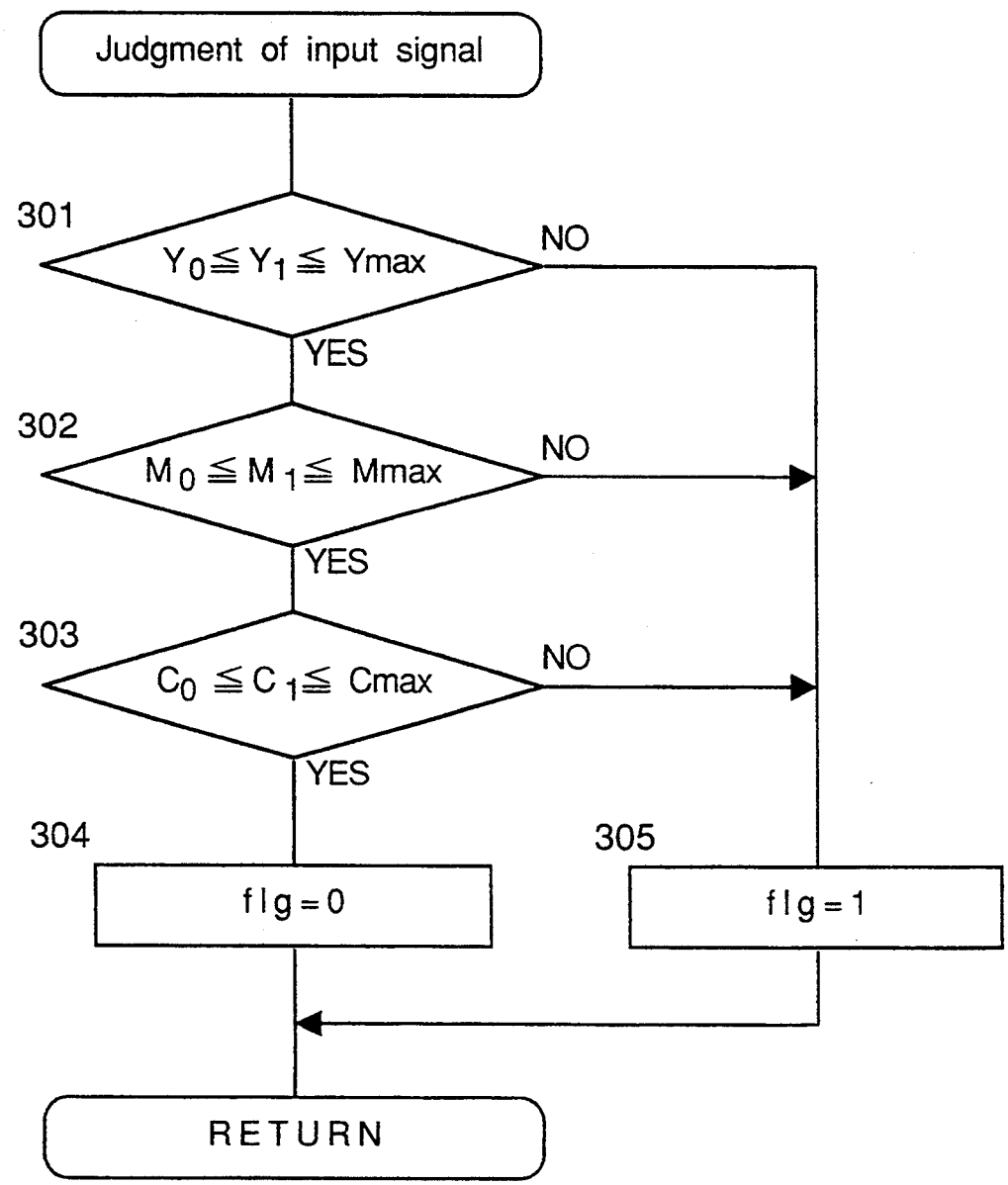
FIG. 3 shows a detailed flowchart of the judgment process in the first embodiment.
Figure 5:
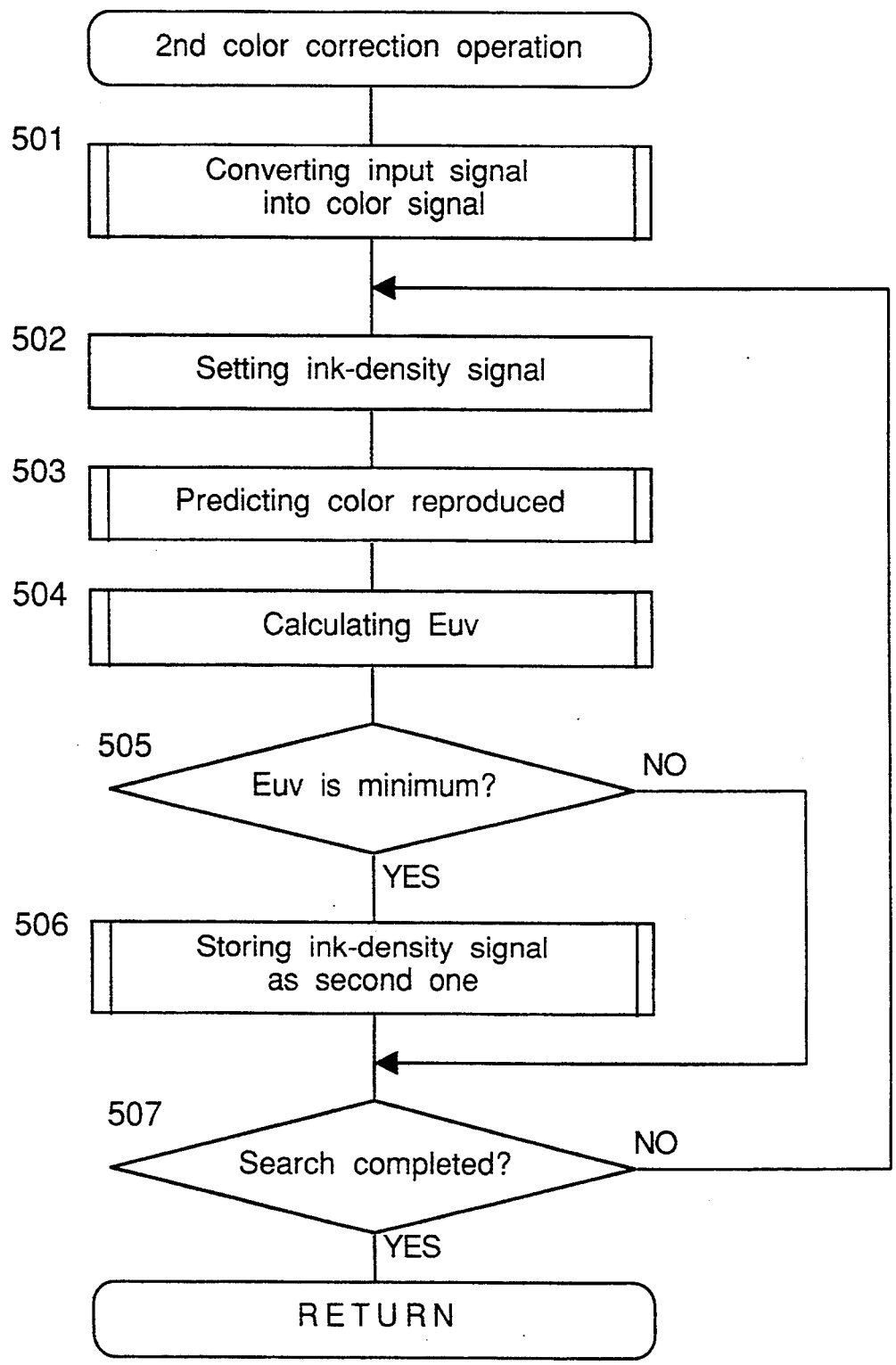
FIG. 5 shows a detailed flowchart of the second color correction process in the first embodiment.

The first embodiment realizes the method of forming color images in accordance with the present invention in the apparatus composed as above by software. A flowchart of overall processing performed by CPU 201 is shown in FIG. 1, and detailed flowcharts of subroutines of the main processing are shown in FIGS. 3 and 5.

Figure 1:
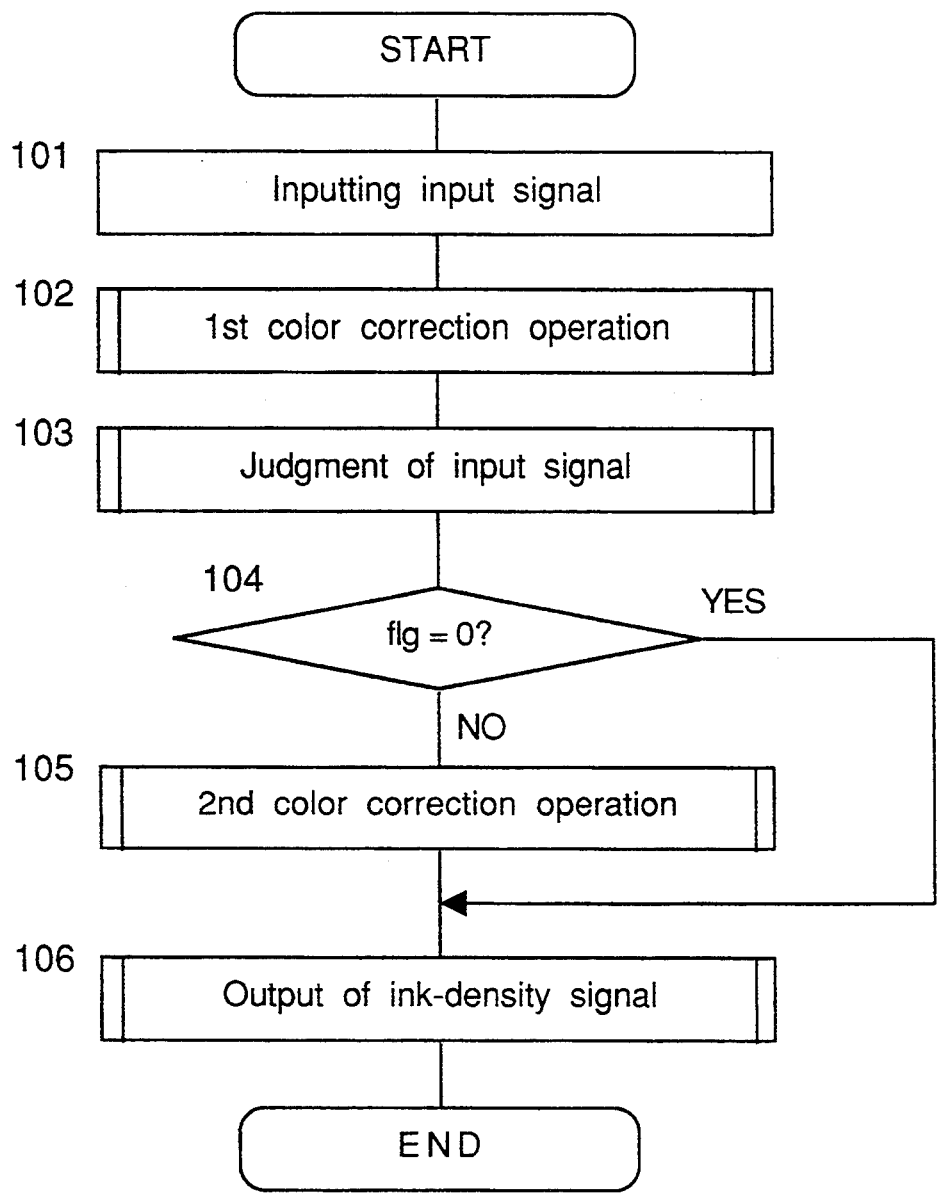
FIG. 1 shows a flowchart of the method of forming color images in the first embodiment in accordance with the present invention.

First, overall procedure is described referring to FIG. 1.

Step 101 inputs an input signal (R, G, B) to be printed through I/O means 204.

Step 102 is a first color correction process, which performs optimal color correction for a color reproducible by a printer for an input signal (R, G, B) and obtains a first ink-density signals (Y1, M1, C1).

Step 103 is a judgment process, which judges whether the input signal (R, G, B) indicates a color reproducible by the printer based on the first ink-density signals (Y1, M1, C1). If the input signal indicates a color reproducible by the printer, then Step 103 sets a flag signal flg as flg=0. If not, then Step 103 sets flg=1.

Step 104 is a conditional branch instruction. If flg=0, i.e. the input signal (R, G, B) indicates a color reproducible by the printer, then the processing proceeds to Step 106. If flg=1, i.e. the input signal (R, G, B) indicates a color unreproduceable by the printer, then the processing proceeds to Step 105.

Step 105 is a second color correction process, which performs a second color correction operation for an input signal which can not be realized by the printer and obtains a second ink-density signal (Y2, M2, C2) that produces an optimal color reproducible by the printer.

Step 106 outputs an ink-density signal (Y, M, C) from I/O means 204 depending on the flag signal flg. If flg=0, then (Y, M, C)=(Y1, M1, C1), and if flg=1, then (Y, M, C)=(Y2, M2, C2).

Then controller 206 controls the heat quantities of thermal head 207 in the face order of yellow, magenta, and cyan depending on the ink-density signal (Y, M, C) output from I/O means 204, so that gradation reproduction is performed on an image-receiving sheet of paper and a color image is formed.

Next, the first color correction process performed by Step 102 is described in the following. In "the present embodiment, a mixed operation composed of linear operation for luminance signals and nonlinear masking operation for density signals is used for the first color correction. The details are as follows.

First, the following luminance matrix operation (3) is applied to the input signal (R, G, B) to obtain a second luminance signal (R', G', B') in order to correct the difference of the central wavelengths between the spectral characteristics of the phosphor used in the CRT and the spectral absorption characteristics of the inks used in the printer.

$$\begin{bmatrix} R' \\ G' \\ B' \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} R \\ G \\ B \end{bmatrix} \quad (3)$$

Next, each component of the second luminance signal (R', G', B') is converted into a component of a primary color density signal ($D_R$, $D_G$, $D_B$) for subtractive mixture of colors by the following complementary color transformation (4).

$$D_R = \log_{10}(1/R')$$

$$D_G = \log_{10}(1/G')$$

$$D_B = \log_{10}(1/B') \quad (4)$$

Further a nonlinear masking operation is applied to correct color turbidity caused by components of light unnecessarily absorbed by inks.

First, the primary color density signal is converted into a signal corresponding to color materials of inks. Specifically, if a constant that expresses the degree of nonlinearity in the relation between the color materials of inks and the color densities is denoted by a, where a > 1, then, by a first nonlinear transformation formula shown in the following (5), the primary color density signal ($D_R$, $D_G$, $D_B$) is converted into a signal (C', M', Y') corresponding to color materials of inks.

$$C' = D_R^a$$

$$M' = D_G^a$$

$$Y' = D_B^a \quad (5)$$

Next, by a linear transformation shown in the following (6), the output signal (C', M', Y') of the first nonlinear transformation is converted into (C'', M'', Y'').

$$\begin{bmatrix} C'' \\ M'' \\ Y'' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} C' \\ M' \\ Y' \end{bmatrix} \quad (6)$$

Further, (C'', M'', Y'') is converted into (Y1, M1, C1) by the following (7), which is the inverse of (5).

$$C1 = C''^{1/a}$$

$$M1 = M''^{1/a}$$

$$Y1 = Y''^{1/a} \quad (7)$$

In the present embodiment, the correction coefficients $\{b_{kl}\}$ of (3), $\{a_{kl}\}$ of (6), where, k=1, 2, 3, and l=1, 2, 3, and the constant a of (5) and (7) are determined by a successive approximation so that the average errors between each color reproduced by a CRT and the corresponding color reproduced by the printer for about color chips uniformly located in the color gamut reproducible by the printer. The actual values of these correction coefficients are as follows.

$$\begin{bmatrix} b_{11} & b_{12} & b_{13} \\ b_{21} & b_{22} & b_{23} \\ b_{31} & b_{32} & b_{33} \end{bmatrix} = \begin{bmatrix} 0.896 & 0.096 & 0.008 \\ 0.002 & 0.835 & 0.163 \\ 0.068 & -0.035 & 0.967 \end{bmatrix} \quad (8)$$

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1.443 & -0.105 & 0.037 \\ -0.360 & 1.694 & -0.032 \\ 0.002 & -0.679 & 1.978 \end{bmatrix}$$

$$a = 1.572$$

The first color correction operation used in the present embodiment performs color correction for colors reproducible by the printer with the color difference Euv=4.3 on an average in the perceptually-uniform color space.

Next, the judgment process (Step 103) that judges whether or not an input signal (R, G, B) indicates a color reproducible by the printer is described in detail in the following.

FIG. 4 shows the color gamut reproducible by the printer in the ink-density space, which expresses the density of each ink of yellow (Y), magenta (M), and cyan (C) by a coordinate on the corresponding axis. FIG. 4 (a) shows a perspective view of the color gamut. FIG. 4 (b) shows the color range projected on the YC plane. FIG. 4 (c) shows the color range projected on the MC plane. FIG. 4 (d) shows the color range projected on the YM plane. As shown in FIGS. 4(a) to 4(d), the color gamut is determined by the density that can be reproduced by each ink. If the color densities of the paper used for printing of yellow, magenta, and cyan are respectively denoted by Y0, M0, C0, and the corresponding maximum densities that can be printed are respectively denoted by Ymax, Mmax, Cmax, then the color range is the rectangular solid enclosed by the six planes, Y=Y0, M=M0, C=C0, Y=Ymax, M=Mmax, C=Cmax.

Therefore, when a first color correction operation performs optimal color correction for colors reproducible by the printer, whether the input signal (R, G, B) indicates a color reproducible by the printer is judged by testing whether Y0≦Y1≦Ymax, M0≦M1≦Mmax, and C0≦C1≦Cmax for the first ink-density signal (Y1, M1, C1) obtained by the first color correction process. Step 103 performs this test. The detail is described in the following referring to the flowchart of FIG. 3.

Step 301 tests whether Y0≦Y1≦Ymax or not. If not, then the input signal is judged to indicate a color unreproduceable by the printer. Similarly, step 302 tests whether M0≦M1≦Mmax or not, and Step 303 tests whether C0≦C1≦Cmax or not.

If the input signal is judged to indicate a color unreproduceable by the printer by one of Steps 301, 302, and 303, then Step 305 sets flg=1. If the input signal satisfies all the test conditions of Steps 301, 302, and 303, then Step 304 sets flg=0.

In this way, the present embodiment judges whether the input signal (R, G, B) indicates a color reproducible by the printer based on the first ink-density signal (Y1, M1, C1) obtained by the first color correction process.

Next, the second color correction process (Step 105) is described in the following. The second color correction operation first obtains the color indicated by the input signal (R, G, B), i.e. a target color for color reproduction by the printer. Then the second color correction operation sets ink-density signals, obtains predicted colors realized by the ink-density signals, chooses an optimal ink-density signal such that an evaluation value calculated by the target color and the predicted color becomes minimal. FIG. 5 shows a detailed flowchart of the second color correction process. First, Step 501 converts the input signal (R, G, B) into a color signal of a target color for color reproduction by the printer. In the present invention, the input signal is a primary color luminance signal (R, G, B) that drives a CRT. Therefore, tristimulus values ($X_0$, $Y_0$, $Z_0$), which are reproduced when the primary color luminance signal is input to a CRT of the NTSC system, is obtained by the following output equation (9) for a CRT of the NTSC system.

$$\begin{bmatrix} X_0 \\ Y_0 \\ Z_0 \end{bmatrix} = \begin{bmatrix} 0.60699 & 0.17345 & 0.20057 \\ 0.29897 & 0.58642 & 0.11461 \\ 0.0 & 0.066075 & 1.11586 \end{bmatrix} \begin{bmatrix} R \\ G \\ B \end{bmatrix} \quad (9)$$

Further, considering human visual characteristics, the tristimulus values ($X_0$, $Y_0$, $Z_0$) are converted into the coordinates ($L_0^*$, $u_0^*$, $v_0^*$) in the perceptually uniform $L^*u^*v^*$ space by the following (10).

$$L_0^* = 116(Y_0/Y_n)^{\frac{1}{3}} - 16, \text{ if } Y_0/Y_n > 0.008856 \quad (10)$$
$$= 903.29(Y_0/Y_n), \text{ if } Y_0/Y_n \leq 0.008856$$

$$u_0^* = 13L_0^*(u_0' - u_n')$$
$$v_0^* = 13L_0^*(v_0' - v_n')$$

where $$u_0' = 4x_0/(X_0 + 15Y_0 + 3Z_0)$$

$$v_0' = 9Y_0/(X_0 + 15Y_0 + 3Z_0)$$

and $$Y_n = 100$$

$$u_n' = 0.2009$$

$$v_n' = 0.4609$$

if a standard light source used for illumination is the C light source and the field of view is 2 degrees wide.

Next, Step 502 sets values of an ink-density signal to search for an optimal ink-density signal.

Step 503 predicts the color ($L_i^*$, $u_i^*$, $v_i^*$) reproduced by the printer when the ink-density signal set by Step 502 is used.

Step 504 obtains the evaluation value Euv for the set ink-density signal using the target color ($L_0^*$, $u_0^*$, $v_0^*$) and the predicted color ($L_i^*$, $u_i^*$, $v_i^*$). The evaluation value Euv in the present embodiment is the color difference in the perceptually uniform space between the target color and the predicted color defined by the following (11).

$$\text{Euv} = \{(L_0^* - L_i^*)^2 + (u_0^* - u_i^*)^2 + (v_0^* - v_i^*)^2\}^{\frac{1}{2}} \quad (11)$$

Step 505 judges whether the Euv obtained by Step 504 is minimal or not.

Step 506 stores the ink-density signal set by Step 502 as the second ink-density signal (Y2, M2, C2), if Step 505 judges that the Euv is minimal.

Step 507 tests if the search for an optimal ink-density signal has been finished or not. If the search has not been finished, then the processing returns to Step 502, and repeats Steps from 503 to 507.

Next, the prediction of color reproduction in Step 503 for a set ink-density signal is described in the following. The first color correction operation in the present embodiment is a nonlinear operation including the nonlinear transformations (4), (5), and (7). Since each of these nonlinear transformations and linear transformations (3) and (6) is a one-to-one transformation, a conversion of the ink-density signal into a primary color luminance signal can be obtained by the inverse of the first color correction operation. Therefore, the present embodiment performs the prediction of color reproduction by converting the ink-density signal into a primary color luminance signal and then converting the results into the color signal in the perceptually-uniform color space in the same way as a target color is obtained.

Specifically, the set ink-density signal (C2, M2, Y2) is converted into (C2″, M2″, Y2″) by the following nonlinear transformation (12).

$$C2'' = C2^a$$

$$M2'' = M2^a$$

$$Y2'' = Y2^a \quad (12)$$

Then (C2″, M2″, Y2″) is converted into (C2′, M2′, Y2′) by the following (13), which is the inverse of transformation (6).

$$\begin{bmatrix} C2' \\ M2' \\ Y2' \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1} \begin{bmatrix} C2'' \\ M2'' \\ Y2'' \end{bmatrix} \quad (13)$$

Then (C2′, M2′, Y2′) is converted into a primary color luminance signal ($D2_R$, $D2_G$, $D2_B$) by the following nonlinear transforation (14).

$$D2_R = C2'^{1/a}$$

$$D2_G = M2'^{1/a}$$

$$D2_B = Y2'^{1/a} \quad (14)$$

Further, ($D2_R$, $D2_G$, $D2_B$) is converted into a luminance signal (R2′, G2′, B2′) of additive color mixture by the inverse of the complementary color transformation (4).

$$R2' = 10^{-D2R}$$

$$G2' = 10^{-D2G}$$

$$B2' = 10^{-D2B} \quad (15)$$

Then (R2′, G2′, B2′) is converted into a primary color luminance signal (R2, G2, B2) by the following linear transformation (16), which is the inverse of (3).

$$\begin{bmatrix} R2 \\ G2 \\ B2 \end{bmatrix} = \begin{bmatrix} b_{11} & b_{12} & b_{13} \\ b_{21} & b_{22} & b_{23} \\ b_{31} & b_{32} & b_{33} \end{bmatrix}^{-1} \begin{bmatrix} R2' \\ G2' \\ B2' \end{bmatrix} \quad (16)$$

Finally, (R2, G2, B2) is converted into tristimulus values $(X_i, Y_i, Z_i)$ by the transformation of (9) and then converted into coordinates $(L_i^*, u_i^*, v_i^*)$ by the transformation of (10).

As mentioned before, the first color correction operation is performed with Euv=4.3 on an average for colors reproducible by the printer. The second color correction operation is also performed with about Euv=4.3.

Figure 6A:
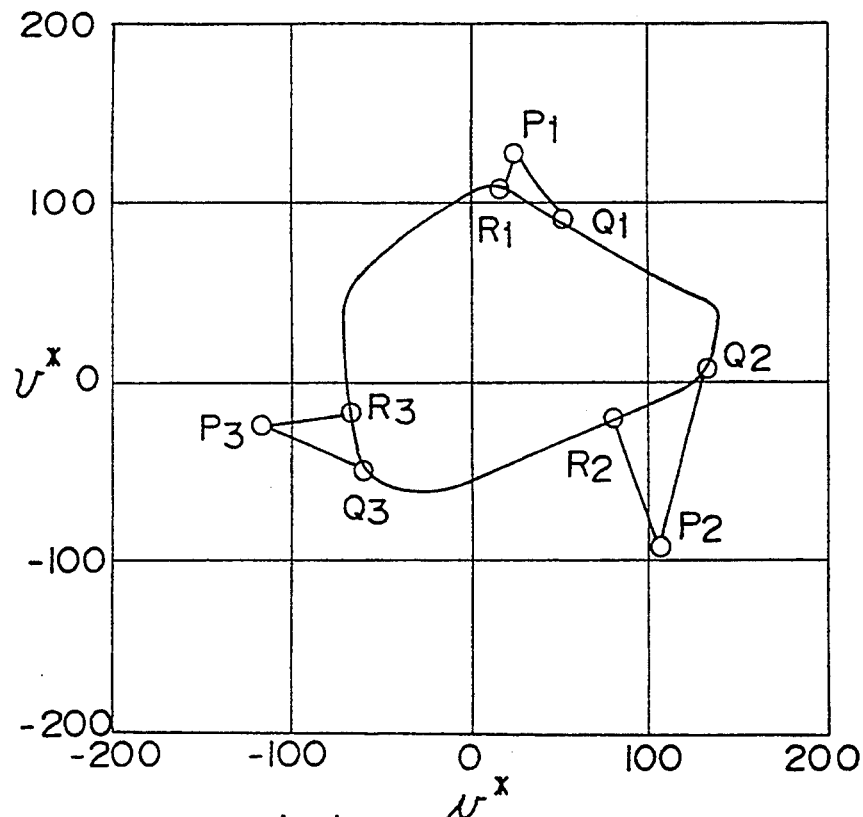
FIGS. 6(a), 6(b) and 6(c) show a result of a color reproduction by the first embodiment with respect to $\mu^*$-$v^*$, $\mu^*$-$L^*$ and $v^*$-$L^*$ planes of a perceptually-uniform color space, respectively.
Figure 6B:
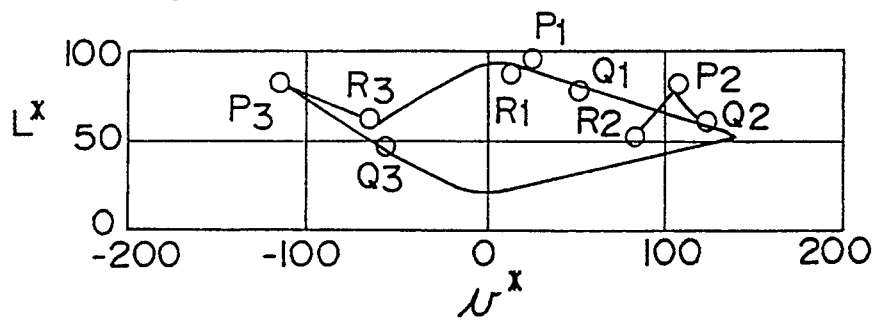
Figure 6C:
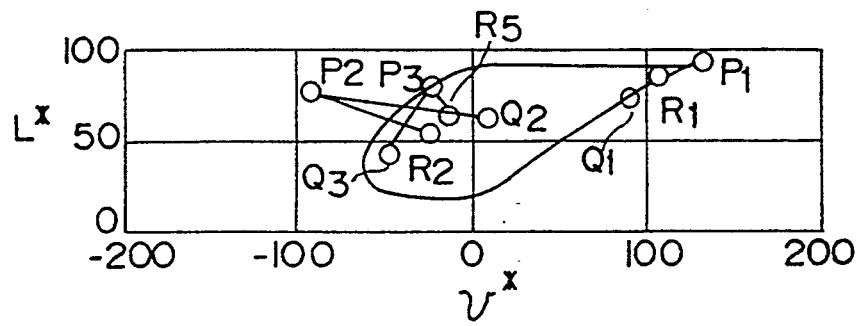

Results of an experimental color reproduction by the first embodiment are shown in FIG. 6, which plots target colors and corresponding reproduced colors in the perceptually uniform L*u*v* space. In FIG. 6, $P_i$, i=1, 2, 3, are target colors which are unreproduceable by a printer, $Q_i$, i=1, 2, 3, are corresponding colors reproduced by a prior techniques using a masking operation and limiters, and $R_i$, i=1, 2, 3, are colors reproduced by the present embodiment. It is observed that the color correction of the present embodiment uses a color reproducible by the printer and locating apart from its target color by a minimal distance.

In this way, the present embodiment performs color correction using a color reproducible by a printer and having a minimal distance from its target color in the perceptually uniform space to improve image quality.

The composition of the apparatus, the process of determining the ink-density signal for an input signal, and experimental results have been described above for the first embodiment.

In the present embodiment, the judgment on whether an input signal indicates a color reproducible by a printer or not is performed using the result of the first color correction operation. Among methods not using this result, there is a method that uses a table of judgment results on whether each of all possible input signals is reproducible by a printer or not. The table is made, for example, by expressing colors reproducible by a printer as a range of the perceptually-uniform color space, and comparing each input signal with this range. Since the color gamut reproducible by a printer has a complex shape in the space of input color signals, a vast amount of time is necessary to make the table. Moreover, if an input signal is expressed by 8 bits for each color, then a large memory of $2^{24}$ bits is needed. In contrast, the judgment method of the present embodiment requires the comparison operation for the first ink-density signals (Y1, M1, C1), so that the processing time is saved when the judgment is performed by software, and the circuit scale is saved when the judgment is implemented by hardware.

In the present embodiment, the prediction about color reproduction for a set ink-density signal is made by the inverse operation of the first color correction operation. Among methods of predicting color reproduction for a set ink-density signal is a method of using a table showing the correspondence between ink-density signals and color measurements of color chips made by ink-density signals. The color chips are prepared for colors situated in a boundary of the color range reproducible by the printer, i.e. for each ink-density signal such that at least one of its values is a color density of the used paper or the maximum density of the color. The prediction for the ink-density signal not listed on the table is obtained by interpolation. However, this method needs a large number of color chips and a vast amount of time for measurement. Moreover, since the color gamut reproducible by a printer has a complex shape in the space of input color signals, errors caused by the interpolation become great. In contrast, the method of predicting color reproduction in the present embodiment does not need time and labor for making the table and obtains about the same precision as the first color correction operation.

Next, the second embodiment of the method of forming color images in accordance with the present invention is described in the following. The experimental apparatus used in the second embodiment and the overall flowchart is the same as in the first embodiment, but the second color correction process is different.

Figure 7:
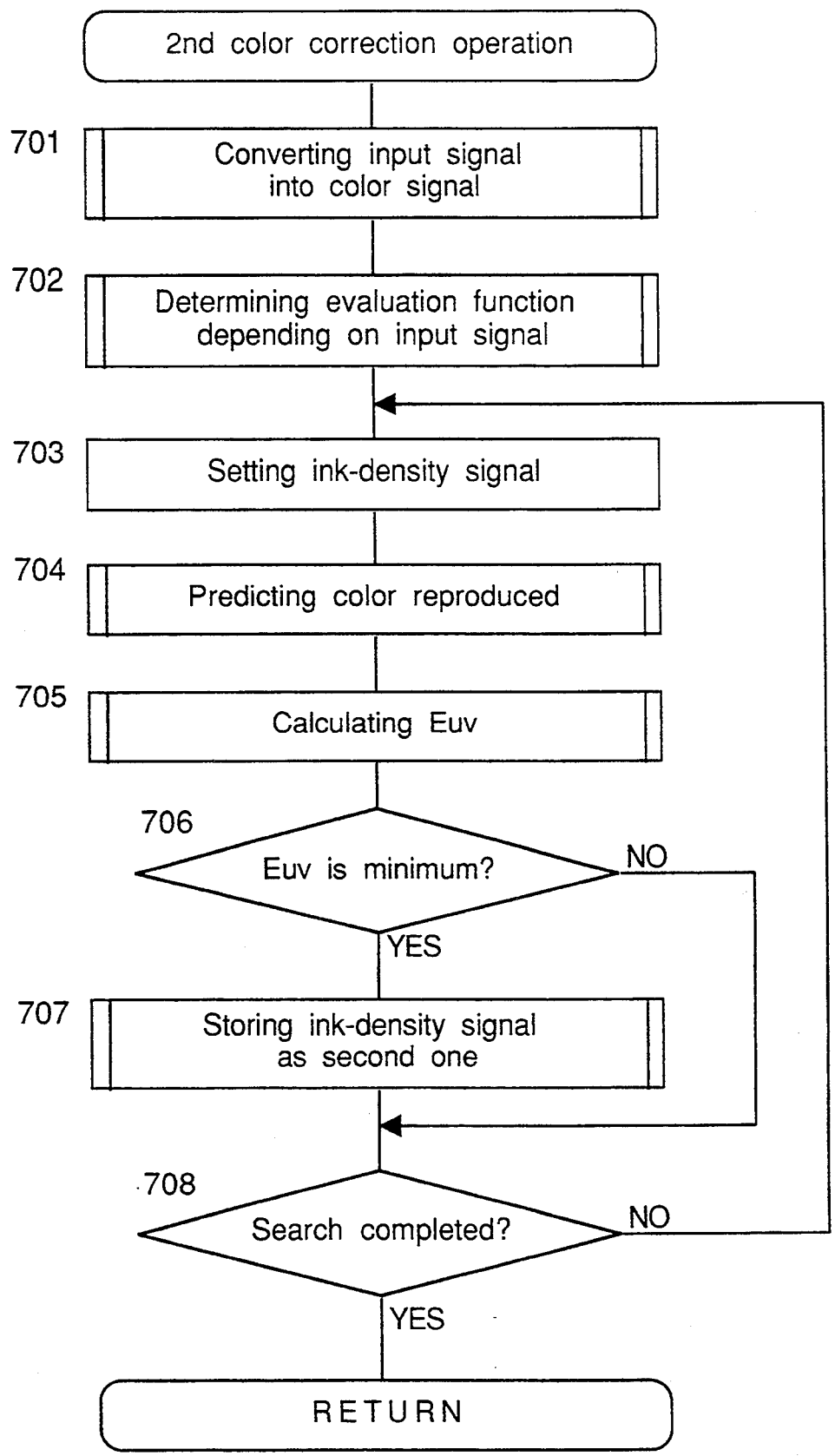
FIG. 7 shows a detailed flowchart of the second color correction process in the method of forming color images in the second embodiment in accordance with the present invention.

The second color correction process in the second embodiment is described in the following. FIG. 7 shows a flowchart of the second color correction process of the second embodiment. The second color correction operation of the present embodiment varies an evaluation function depending on the input signal (R, G, B) and obtains an ink-density signal such that the evaluation value becomes minimal.

First, Step 701 converts the input signal (R, G, B) into a coordinate $(L_0^*, u_0^*, v_0^*)$ in the perceptually uniform L*u*v* color space.

Step 702 determines the evaluation function depending on the input signal.

Step 703 sets an ink-density signal to search for an optimal ink-density signal.

Step 704 predicts the color $(L_i^*, u_i^*, v_i^*)$ reproduced by the printer if the ink-density signal set by Step 703 is used.

Step 705 obtains the evaluation value for the set ink-density signals using the target color $(L_0^*, u_0^*, v_0^*)$ and the predicted color $(L_i^*, u_i^*, v_i^*)$ based on the evaluation function determined by Step 704.

Step 706 judges whether the evaluation value obtained by Step 705 is minimal or not.

Step 707 stores the ink-density signals set by Step 703 as the second ink-density signal (Y2, M2, C2), if Step 706 judges that the Euv is minimal.

Step 708 tests if the search for an optimal ink-density signal has been finished or not. If the search has not been finished, then the processing returns to Step 502, and repeats Steps from 703 to 708.

The prediction by Step 704 of color reproduction for a set ink-density signal is performed by converting the ink-density signal into a color signal in the L*u*v* color space in the same way as in the first embodiment.

Next, the evaluation function that evaluates the optimality of a color reproduced by a printer in the present embodiment is described in the following.

The evaluation function E is given by the following (17), where ΔL, ΔH, and ΔS respectively express differences of lightnesses, hues, and saturations between the target color $(L_0^*, u_0^*, v_0^*)$ and the predicted reproduction color $(L_i^*, u_i^*, v_i^*)$, and a, b, and c are weights. Here, the saturation and hue are those in the L*u*v* color space, and the difference of hues is multiplied by the average of the saturations of the two colors to equalize the units.

$$E = \{(a\Delta L^2 + b\Delta H^2 + c\Delta S^2)/(a+b+c)\}^{\frac{1}{2}} \quad (17)$$

where $$\Delta L = L_0^* - L_i^*$$

$$\Delta S = S_0 - S_i$$
$$S_0 = (u_0^{*2} + v_0^{*2})^{\frac{1}{2}}$$
$$S_i = (u_i^{*2} + v_i^{*2})^{\frac{1}{2}}$$

$$\Delta H = |\theta_0 - \theta_i| \cdot (S_i + S_0)/2$$
$$\theta_0 = \tan^{-1}(v_0^*/u_0^*)$$
$$\theta_i = \tan^{-1}(v_i^*/u_i^*)$$

The weights a, b, and c are varied depending on input signals and determined by the target color indicated by the input signals through an experiment of subjective evaluation.

First, the weights of the evaluation function E are determined for 26 input signals that indicate colors located on the boundary of the range of colors reproducible by a CRT in the color space of RGB luminance signals. The target color of each of the 26 signals is obtained by converting the signal into coordinates in the L*u*v* color space. Then three evaluation functions, each having a combination of weights, are used to make three color chips for each of 26 input signals such that the ink-density signal used for making each color chip minimizes each evaluation function. Then each color chip is compared with the corresponding target color, and one color chip is chosen as an optimal color chip by subjective judgment, so that the evaluation function for each of the 26 input signals is determined to be the evaluation function that was used to make the optimal color chip. The three evaluation functions consist of a lightness-emphasized function, where weight a is set greater than b and c, a hue-emphasized function, where weight b is set greater than a and c, and a uniform function, where weights a, b, and c are set equal.

Figure 8:
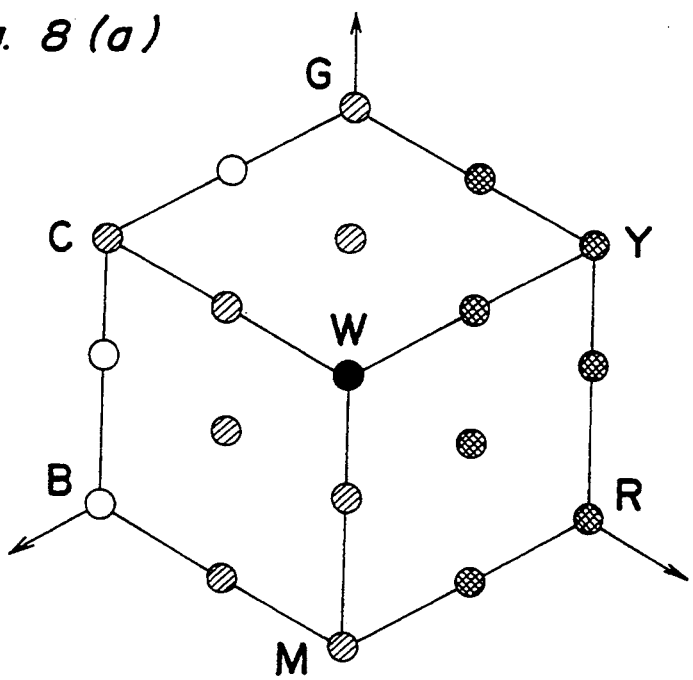
FIGS. 8(a) and 8(b) show examples of an evaluation function in the second color correction operation of the second embodiment, respectively.
Figure 8:
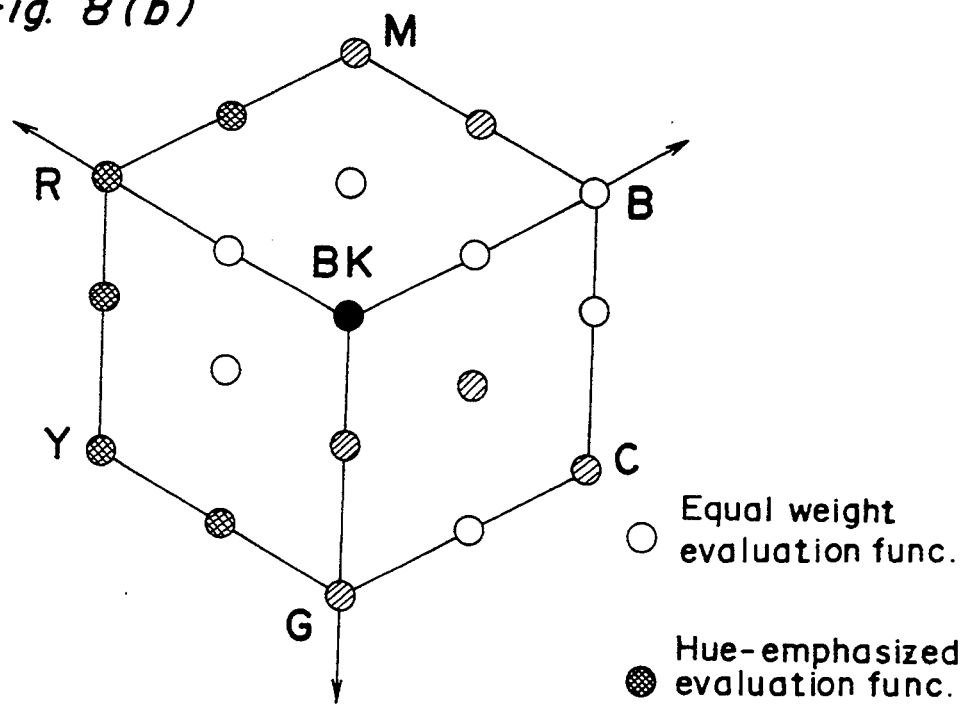

FIG. 8 shows the evaluation functions determined by the above procedure in the RGB luminance color space. FIG. 8(a) shows the cube of colors reproducible by a CRT viewed from white (W), and FIG. 8(b) shows the cube viewed from black (Bk). Each small circle indicate the coordinate of one of the 26 input signal and its evaluation function. For example, if the target color is blue (B) of the CRT, then the uniform function is its evaluation function. if the target color is green (G) of the CRT, then the lightness-emphasized function is its evaluation function. If the target color is black (Bk) or white (W), then any one of the three evaluation functions can be used.

As shown in FIG. 8, the present embodiment determines the ink-density signal for each input signal using an evaluation function whose weights are continuously varied with input signals.

Figure 9A:
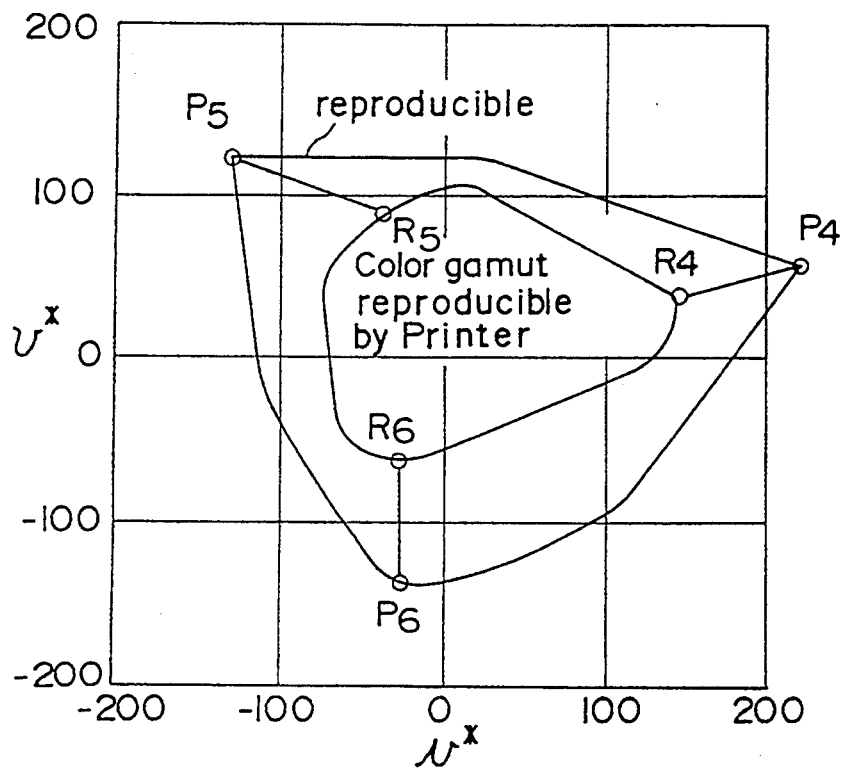
FIGS. 9(a), 9(b) and 9(c) are projections onto $\mu^*$-$v^*$, $\mu^*$-$L^*$ and $v^*$-$L^*$ planes for showing a result of an experimental color reproduction by the second embodiment in a perceptually-uniform color space, respectively.
Figure 9B:
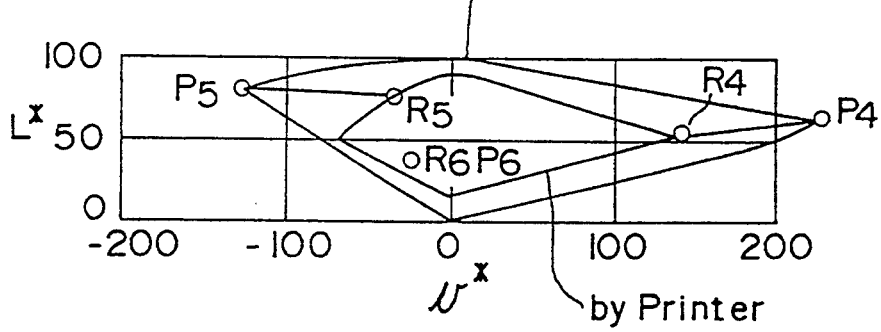
Figure 9C:
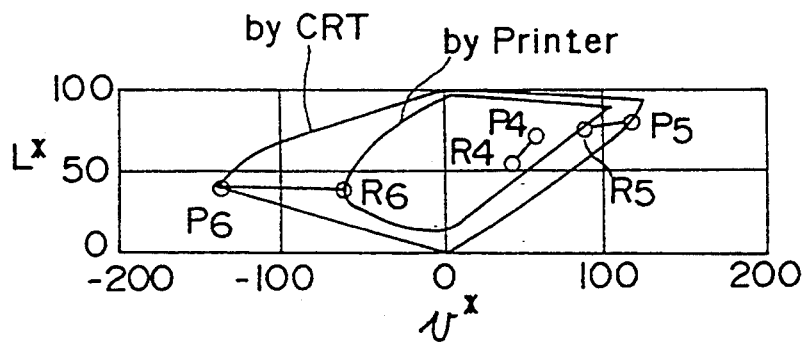

FIG. 9 shows experimental results of color reproduction by the method of the second embodiment. In FIG. 9, the target colors of the input signals indicating red, green, and blue, which are not reproducible by a printer and their reproduced colors are shown in the L*u*v* space. In FIG. 9, points P4 and R4 respectively show the target color and the reproduced color of red; P5 and R5 respectively show the target color and the reproduced color of green; P6 and R6 respectively show the target color and the reproduced color of blue. Since a hue-emphasized evaluation function is used for the input signal indicating red, red is reproduced as a color having almost the same hue as itself and reproducible by a printer. Similarly, green is reproduced as a color having almost the same lightness, and blue is reproduced as a color having a minimal distance from itself in the perceptually uniform space. White is reproduced as a color having the density of paper, and black is reproduced as a color having the maximal density.

The process of determining the ink-density signal for an input signal, the method of determining the evaluation function depending on input signals, and results of experiments have been described above for the second embodiment.

In this way, the present embodiment performs color correction using colors that are reproducible by a printer and people feel to be most preferable based on evaluation functions depending on input signals, so that image quality is greatly improved.

The present embodiment uses evaluation functions shown in FIG. 8, but since the color gamut reproducible by a printer varies with the printing method of the printer and the spectral characteristics of the inks to be used, evaluation functions vary with printers. Therefore, the evaluation functions of the present invention are not limited to the ones shown in FIG. 8.

Next, the method of forming color images of the third embodiment in accordance with the present invention is described in the following.

The apparatus used in the third embodiment is the same as the one in the first embodiment, but the process of determining the ink-density signals is different. In the third embodiment, the ink-density signals for input signals are stored in RAM 202 as an LUT (look-up table), and the ink-density signal used for each input signal is output by referring to the LUT. The ink-density signals in the LUT are determined using a neighborhood operation in the color space of input signals.

Figure 10:
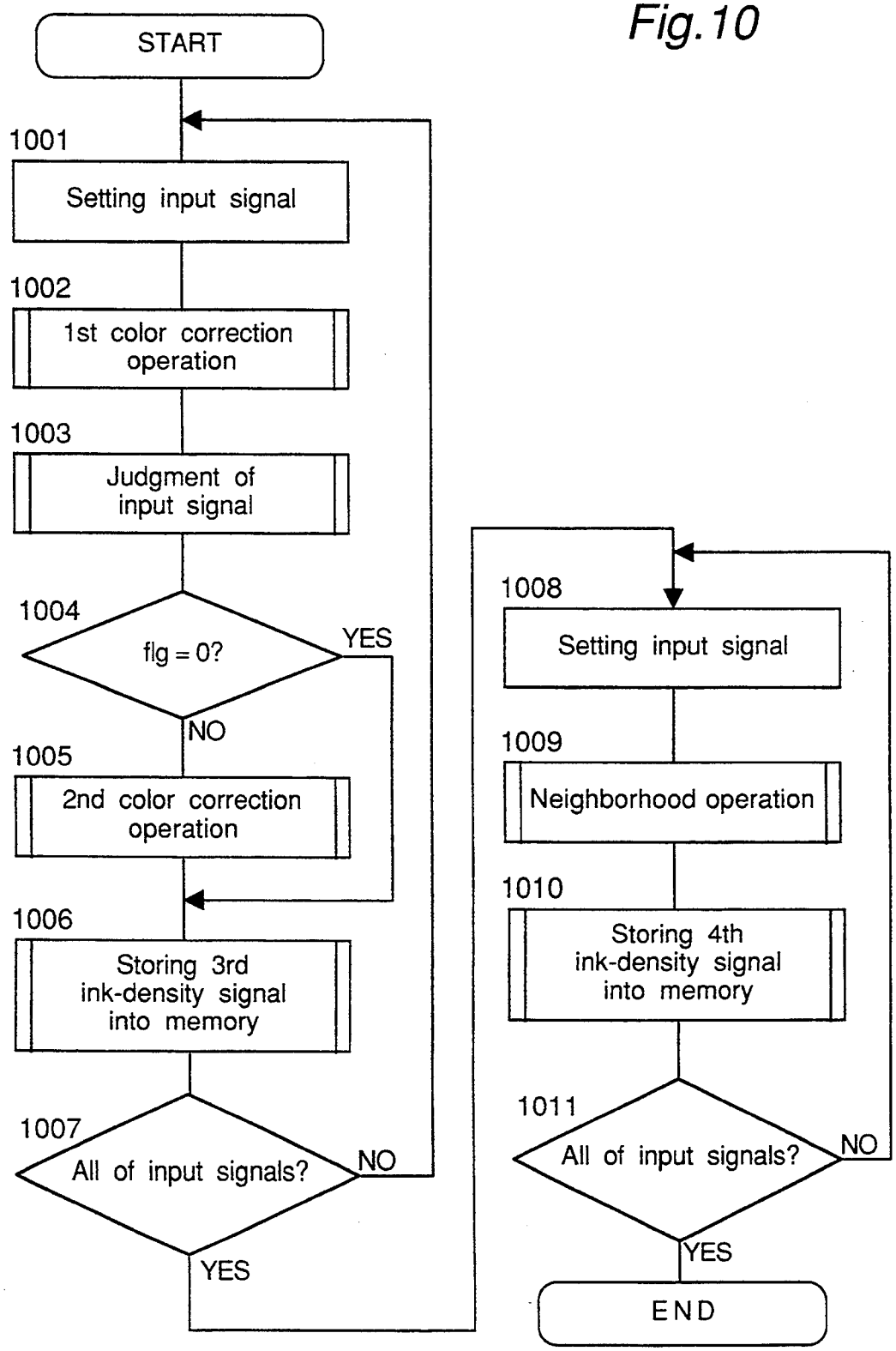
FIG. 10 shows a flowchart of the processing that creates a table of ink-density signals for input signals in the method of forming color images in the third embodiment in accordance with the present invention.

FIG. 10 shows the procedure of determining ink-density signals for the LUT.

First, Step 1001 sets an input signal (R, G, B).

Step 1002 obtains the first ink-density signal (Y1, M1, C1) as in the first embodiment.

Step 1003 judges whether the input signal (R, G, B) indicates a color reproducible by the printer based on the first ink-density signal (Y1, M1, C1). If the input signal indicates a color reproducible by the printer, then Step 1003 sets a flag signal flg as flg=0. If not, then Step 1003 sets flg=1.

Step 1004 is a conditional branch instruction. If flg=0, i.e. the input signal (R, G, B) indicates a color reproducible by the printer, then the processing proceeds to Step 1006. If flg=1, i.e. the input signal (R, G, B) indicates a color unreproduceable by the printer, then the processing proceeds to Step 1005.

Step 1005 obtains, for an input signal (R, G, B) unreproduceable by the printer, the second ink-density signal (Y2, M2, C2) that produces an optimal color reproducible by the printer. The process is the same as of the second color correction process in the first embodiment.

Step 1006 chooses a third ink-density signal (Y3, M3, C3) from the first ink-density signal (Y1, M1, C1) and the second density signal (Y2, M2, C2) depending on the flag signal flg and temporarily stores (Y3, M3, C3) in RAM 202. If flg=0, then (Y3, M3, C3)=(Y1, M1, C1), and if flg=1, then (Y3, M3, C3)=(Y2, M2, C2).

Step 1007 tests if the third ink-density signals (Y3, M3, C3) have been obtained for all input signals. If not, then the procedure returns to 1001; else the procedure proceeds to Step 1008.

From Step 1008 and onward the procedure performs a neighborhood operation for each third ink-density signal (Y3, M3, C3).

Step 1008 sets an input signal.

Step 1009 applies the neighborhood operation to the third ink-density signal corresponding to the input signal set by Step 1008.

Step 1010 stored the result of Step 1009 in the LUT of RAM 202 as a fourth ink-density signal (Y4, M4, C4).

Step 1011 tests if the neighborhood operation has been applied for all input signals. If not, the procedure returns to Step 1008; else the procedure terminates.

Next, the neighborhood operation of Step 1009 is described in the following.

The third ink-density signal is chosen from the result of the first color correction operation and the result of the second color correction operation for the input signal. The second color correction operation obtains an optimal ink-density signal for an input signals unreproduceable by a printer, so that, owing to the shape of the color gamut reproducible by the printer, reproduced colors sometimes suddenly change even if the input signals continuously vary. As a result, the smooth gradation of a reproduced image is damaged. Therefore, the present embodiment performs a three-dimensional spacial filtering in the RGB luminance color space by the neighborhood operation.

Figure 11:
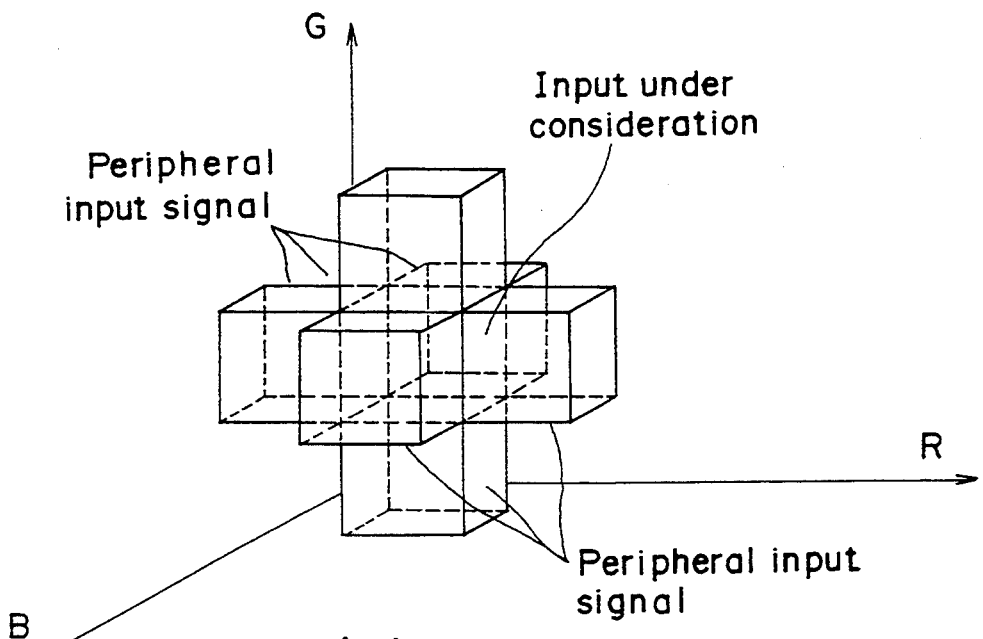
FIG. 11(a) shows input signals used for a typical neighborhood operation in the third embodiment.
FIGS. 11(b) and 11(c) are those when seen in B-R and R-G planes, respectively.
Figure 11:
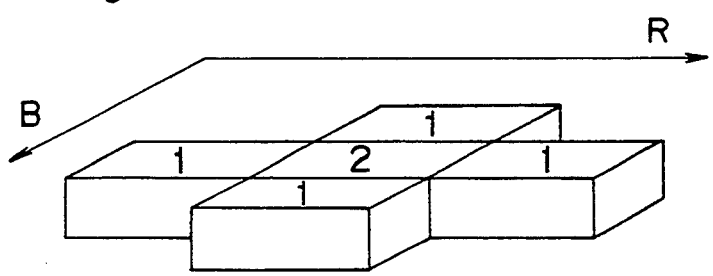
Figure 11:
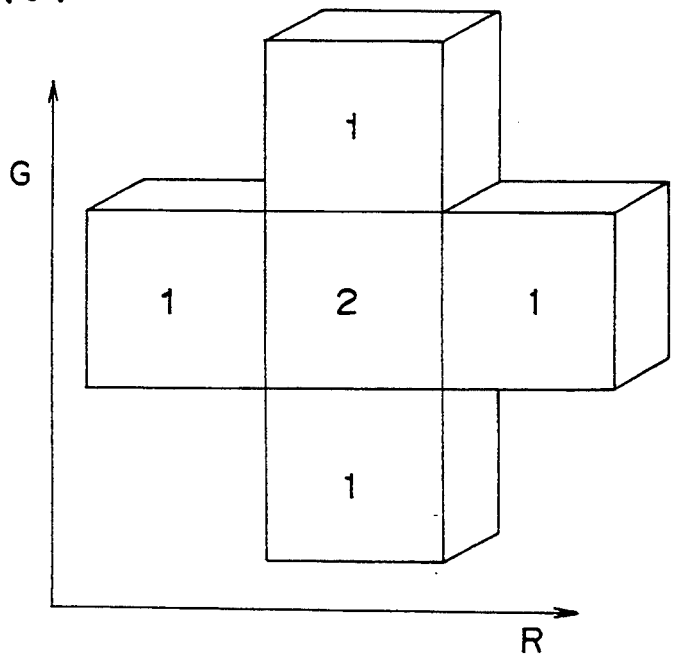

FIG. 11 shows an input signal under consideration and 6 neighboring input signals referred in the neighborhood operation in the RGB color space. If the Y component of the third ink-density signal for the input signal under consideration is denoted by Y3(R, G, B), and the Y component of the third ink-density signals for the 6 neighboring input signals are denoted by Y3(R−1, G, B), Y3(R, G−1, B), Y3(R, G, B−1), Y3(R+1, G, B), Y3(R, G+1, B), and Y3(R, G, B+1), then the fourth ink-density signal Y4(R, G, B) for the input signal under consideration is determined by the following neighborhood operation (18).

$$Y4(R, G, B) = \{2 \times Y3(R, G, B) + Y3(R - 1, G, B) + Y3(R, G - 1, B) + Y3(R, G, B - 1) + Y3(R + 1, G, B) + Y3(R, G + 1, B) + Y3(R, G, B + 1)\} \times \frac{1}{8} \tag{18}$$

The M and C components of the fourth ink-density signal are determined by similar operations.

Figure 12A:
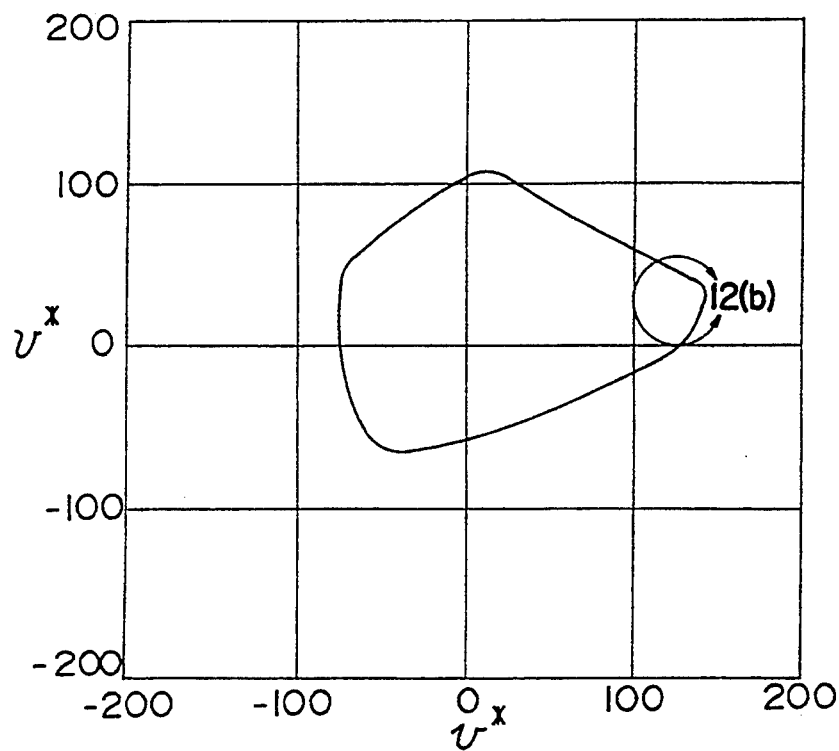
FIGS. 12(a) and 12(b) show an experimental result of color reproduction by the third embodiment in a perceptually-uniform color space.
Figure 12B:
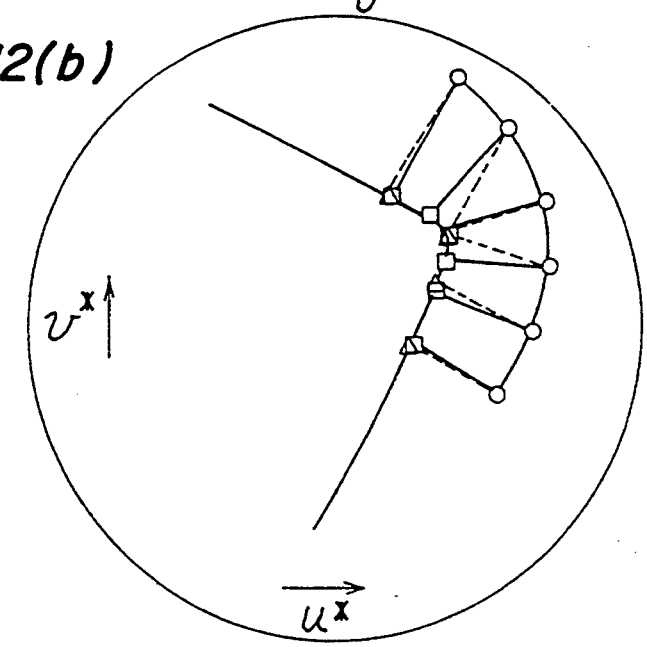

FIGS. 12(a) and 12(b) show an experimental result of color reproduction by the present embodiment. FIG. 12(a) shows the range of colors reproducible by a printer in u*v* plane of the L*u*v* color space, and FIG. 12(b) shows the encircled part in FIG. 12 (a). Target colors and corresponding colors reproduced by a printer by the experiment are plotted in FIG. 12 (b), where each small circle indicates a target color, which is unreproduceable by the printer, the triangle connected to the target color with a dotted line indicates the corresponding reproduced color using the third ink-density signal, and the square connected to the target color with a solid line indicates the corresponding reproduced color using the fourth ink-density signal. As observed from FIG. 12 (b), the color reproduction using the fourth ink-density signals improves the continuity of color reproduction, when the color reproduction using the third ink-density signals produces unnaturally discontinuous color changes.

The process of determining the ink-density signal for an input signal and results of experiments have been described above for the third embodiment. The present embodiment can suppress sudden changes in color reproduction for continuously changing target colors to reduce discontinuous color reproduction by obtaining an optimal color for each input signal and applying a three-dimensional neighborhood operation in the color space of input signals.

The present embodiment limits the number of input signals to 6 to perform a neighborhood operation. However, the present invention does not limit the number of the third ink-density signals to be used and the coefficients of the formula (18) for a neighborhood operation to those of the present embodiment.

Next, the apparatus of forming color images of the fourth embodiment in accordance with the present invention is described in the following.

The fourth embodiment uses, as its input signal, a Y-corrected luminance signal (r, g, b), each component being an 8-bit signal, and forms color images by a sublimation type thermal transfer printer using inks of cyan, magenta, and yellow.

In the fourth embodiment, the ink-density signals for 32×32×32 representative points, each expressed by the upper 5 bits of each 8-bit component of the input signal (r, g, b), are stored in an LUT (look-up table). The ink-density signal for a point between those representative points is determined by the method of three-dimensional linear interpolation.

Figure 14:
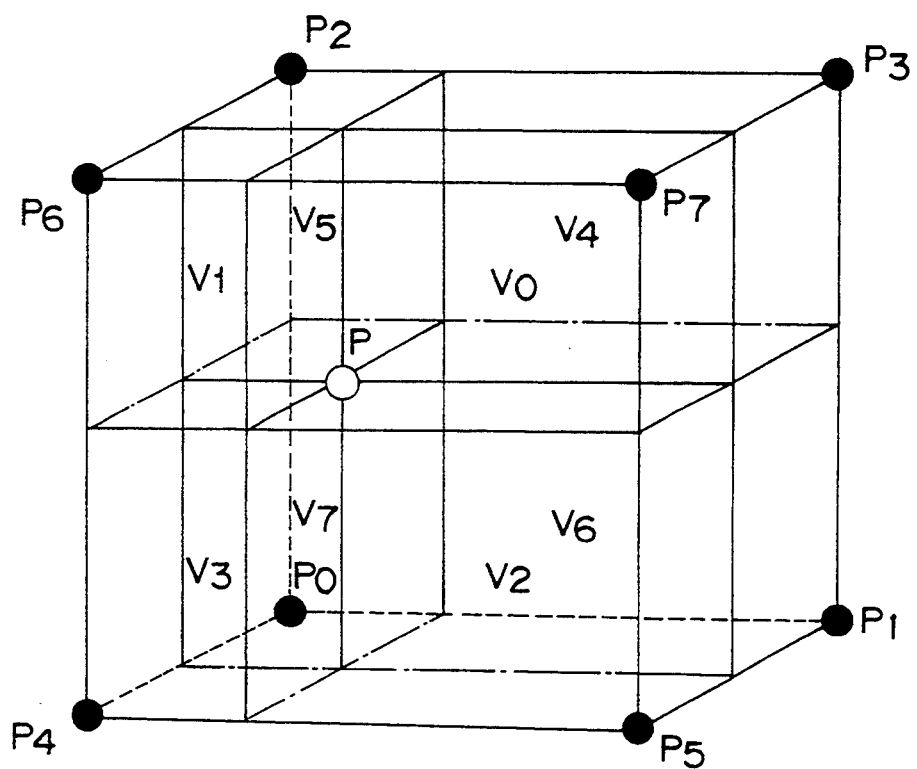
FIG. 14 shows a method of interpolation by the apparatus of forming color images in the fourth embodiment.
Figure 16:
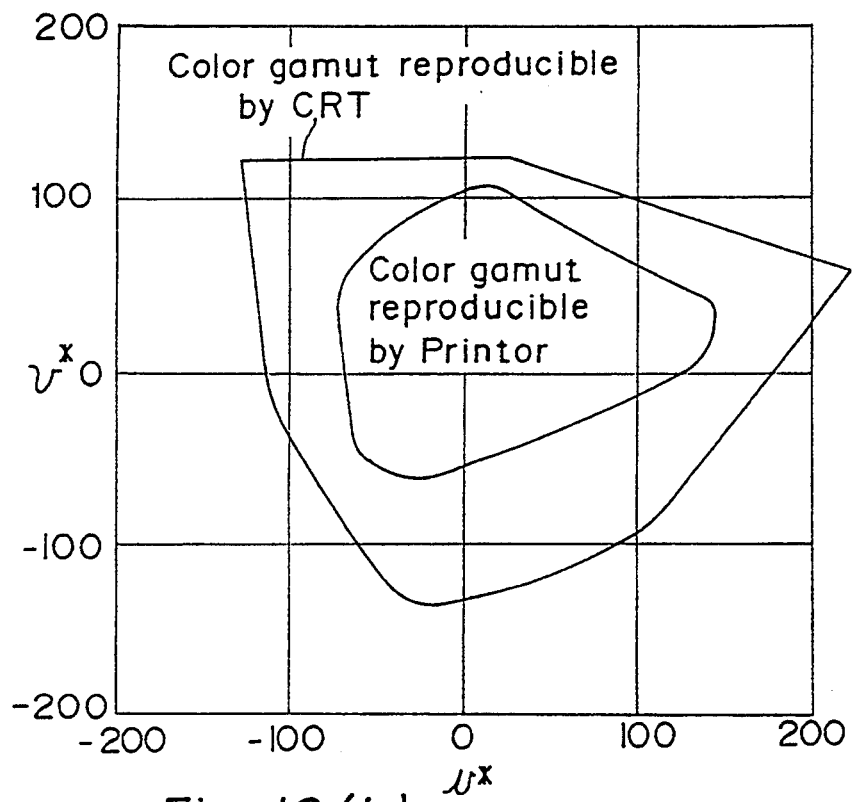
FIGS. 16(a), 16(b) and 16(c) show color gamuts reproducible by a CRT and a printer with respect to $\mu^*$-$v^*$, $\mu^*$-$L^*$ and $v^*$-$L^*$ planes, respectively.
Figure 16:
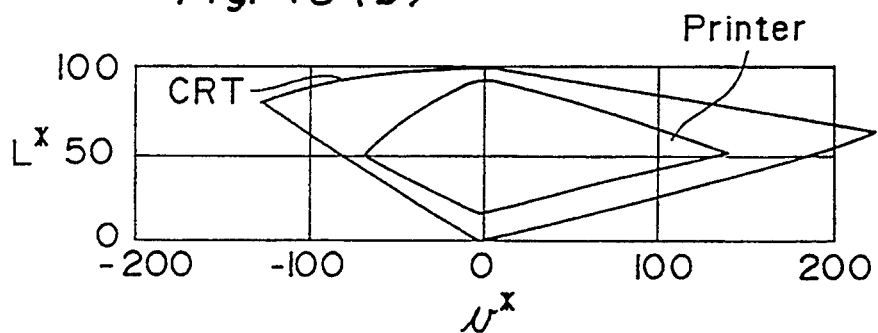
Figure 16:
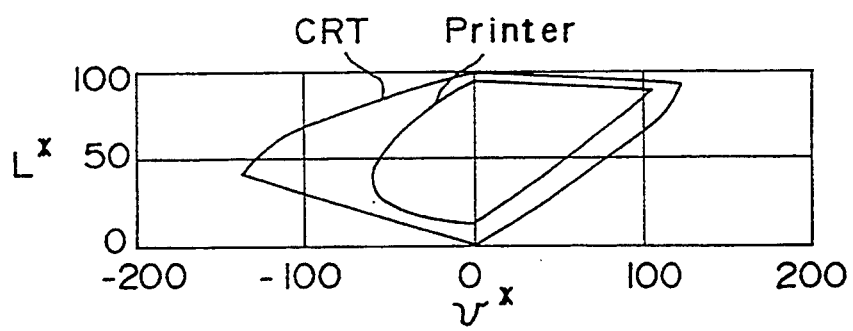
Figure 17:
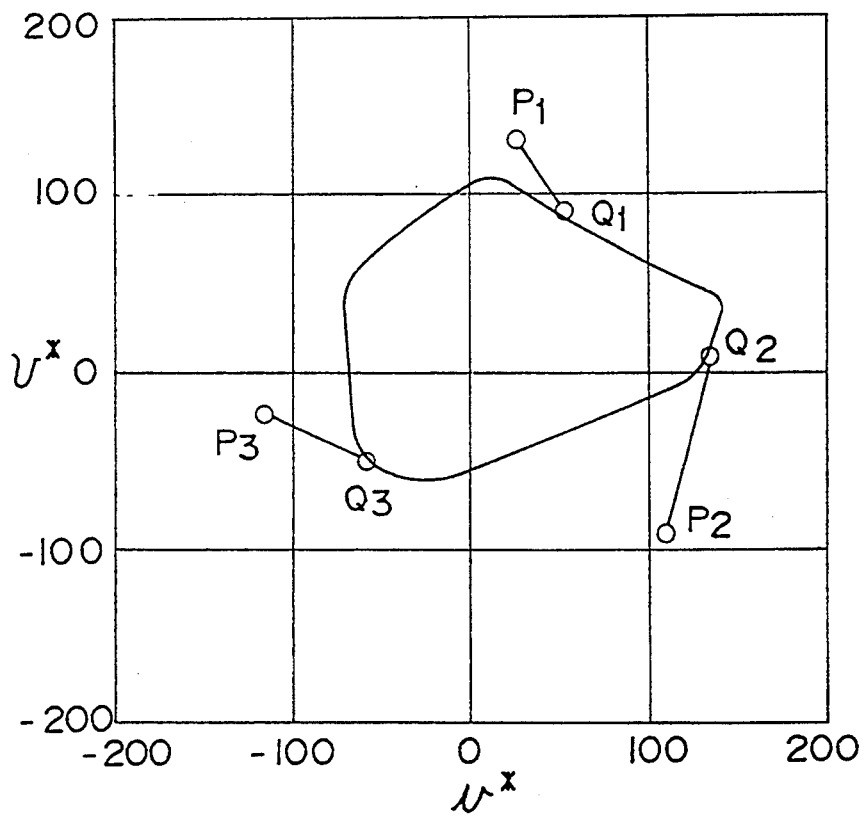
FIGS. 17(a), 17(b) and 17(c) show color reproduction by a prior method of forming color images with respect to $\mu^*$-$v^*$, $\mu^*$-$L^*$ and $v^*$-$L^*$ planes, in case an input signal indicates a color unreproduceable by a printer.
Figure 17:
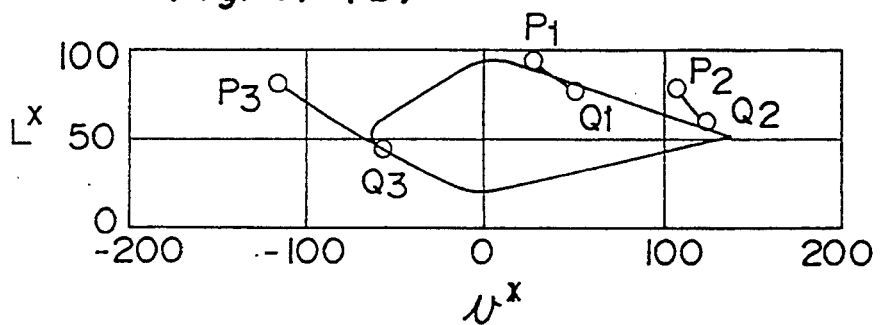
Figure 17:
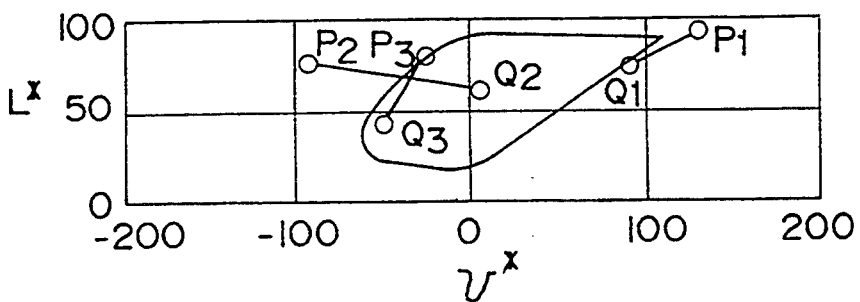

Before the composition and operation of the present embodiment is described, the method of interpolation is explained with reference to FIG. 14. FIG. 14 shows a unit cube formed by neighboring 8 representative points Pk, k=0, 1, ... 7 in the rgb space. For an input signal expressed by a point P inside the cube, the three planes parallel to rg plane, gb plane, and rb plane passing through P divide the cube into 8 rectangular solids, and the volume of the rectangular solid containing the vertex Pk is denoted by Vk. If the ink-density signal of the representative point Pk is (Ck, Mk, Yk), then the ink-density signal of point P is determined by the following interpolation formula (19).

$$C = \sum_{k=0}^{7} Ck \cdot Vk/V \tag{19}$$

$$M = \sum_{k=0}^{7} Mk \cdot Vk/V$$

$$Y = \sum_{k=0}^{7} Yk \cdot Vk/V$$

Figure 13:
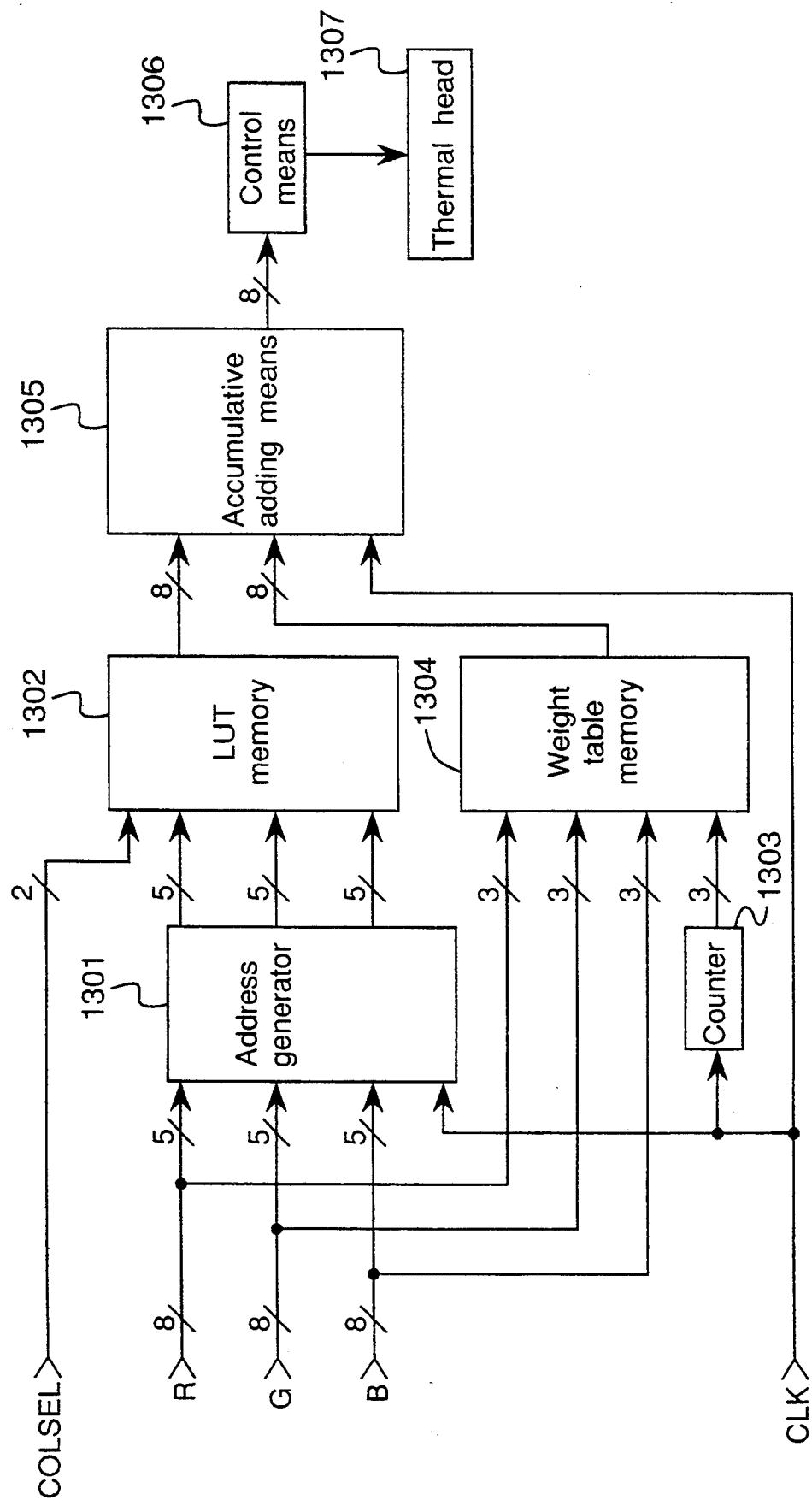
FIG. 13 shows a block diagram of the apparatus of forming color images in the fourth embodiment.

The composition of the fourth embodiment is described in the following. FIG. 13 shows a block diagram of the apparatus of forming color images in the fourth embodiment.

In FIG. 13, 1301 is an address generator that reads the upper five bits of each component of an input signal (r,g b) and outputs the addresses of the 8 representative points of the unit cube that contains the point expressed by the input signal in synchronous with the CLK signal of the input signal.

1302 is an LUT memory that outputs an 8-bit ink-density signal (Y, M, C) corresponding to an address output from address generator 1302 and a 2-bit COLSEL signal that indicates one of cyan, magenta, and yellow currently being printed. LUT 1302 is configured by a ROM of 1M bits (128K bytes) and uses an area of 96K bytes.

1303 is a counter that counts up in synchronous with a CLK signal and outputs a 3-bit signal indicating the k of formula (19)

1304 is a weight table memory that memorizes weights Vk/V of (19), reads the lower three bits of the input signal (r, g, b) and the address output from counter 1303, and outputs a weight Vk/V corresponding to the address.

1305 is a calculating means that multiplies each output of LUT memory 1302 by each output of weight table memory 1304, adds up the products in synchronous with the CLK signal to perform the calculation of (19), and outputs an ink-density signal (Y, M, C) to be used in printing.

1306 is a controller that controls the impression energy depending on the ink-density signal output from calculating means 1305.

1307 is a thermal head that impress an ink sheet with heat depending on the impression energy controlled by controller 1307 and forms a full color image on a sheet of paper.

The operation of the apparatus of the present embodiment for printing the first color, i.e. yellow, is described in the following.

First, address generator 1301 successively outputs the addresses of the 8 vertices of the unit cube corresponding to an input signal in synchronous with the CLK signal. Specifically, if the upper 5 bits of the input signal (r, g, b) are (r0, g0, b0), then these addresses are (r0, g0, b0), (r0+1, g0, b0), (r0, g0+1, b0), (r0+1, g0+1, b0), (r0, g0, b0+1), (r0+1, g0, b0+1), (r0, g0+1, b0+1), and (r0+1, g0+1, b0+1). Then LUT memory 1302 outputs the ink-density signals Y0, Y1, ..., Y7 of yellow corresponding to these addresses.

On the other hand, the lower 3 bits of the input signal (r, g, b) and the output of counter 1303 are provided to weight table 1304, which successively outputs weights V0/V to V7/V.

Then calculating means 1305 calculates formula (19) and outputs the ink-density signal Y of yellow for the input signal (r, g, b).

Controller 1306 controls the impression energy depending on the output signal Y of calculating means 1305, and thermal head 1307 impresses an ink sheet with heat to perform graded printing on a receiving sheet of paper.

After the above operation is performed for printing yellow on the whole receiving sheet of paper, the same operation is performed for magenta, and cyan, so that a graded printing of a full color image is performed on the receiving sheet of paper.

In the present embodiment, the ink-density signals for the 32×32×32 representative points are stored in LUT memory 1302. In order to calculate the ink-density signals, the input signal (r, g, b) for each representative point is converted into a primary-colors signal (R, G, B) by the following (20), and the ink-density signal is obtained from the signal (R, G, B) by the same processing as in the first embodiment.

$$R = r^{2.2}$$
$$G = g^{2.2}$$
$$B = b^{2.2} \qquad (20)$$

In fact, the primary-colors luminance signal (R, G, B) obtained by (20) is converted into a first ink-density signal by (3) to (7) of the first color correction process. Then whether the first ink-density signal is reproducible by the printer or not is judged by the procedure shown in FIG. 3. If the first ink-density signal is reproducible by the printer, then the first ink-density signal is stored in LUT memory 1302. Else, the second ink-density signal determined by the procedure shown in FIG. 5 and operations (9) to (16) is stored in LUT memory 1302.

The composition and operation of the apparatus of forming color images in the fourth embodiment have been described above. The method of forming color images in accordance with the present invention requires operation time for the second color correction operation of determining optimal ink-density signals for input signals unreproduceable by a printer. However, the fourth embodiment stores the ink-density signals in an LUT memory beforehand, so that the ink-density signal is determined by real-time processing for an input signal unreproduceable by a printer. Further, memory size is smaller than in an apparatus storing the ink-density signals for all possible input signals in an LUT memory. As in the first embodiment, color reproduction is performed using optimal available colors for input signals unreproduceable by a printer, so that the present apparatus greatly improves image quality.

Embodiments of the method and apparatus for forming color images in accordance with the present invention have been described above. In each of these embodiment, the input signal is a luminance signal (R, G, B) that drives a CRT, and the first color correction operation is an operation composed of linear operations and nonlinear masking operations. However, the first color correction operation is not limited to that operation. For example, any color correction operation having its inverse such as a prior linear masking operation can be used as the first color correction operation, and the color prediction in the second color correction operation is performed using the inverse of the first color correction operation.

Alternatively, the first color correction operation can be performed by a prior nonlinear masking operation, and the color prediction in the second color correction operation can be performed by a prior linear operation. In this case, color reproduction is performed with high-precision color correction for colors reproducible by a printer, and an optimal color reproduction is performed with color prediction depending on the precision of the linear operation for colors unreproduceable by a printer.

The present embodiments use a sublimation type thermal transfer color printer, but the method and apparatus for forming color images in accordance with the present invention are not limited to the sublimation type thermal transfer color printer.

In this context, the term "ink-density" should be interpreted not in its narrowest meaning but in its widest meaning. Namely, it indicates "toner-density" in the case that color toners are used to reproduce color images.

Further, the interpolation operation for determining an ink-density signal in the fourth embodiment of the present invention employs an 8-point interpolation method, using ratios of volumes, but the present invention does not limit the method of the interpolation to a particular method.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for forming color images, comprising;
 a first color correction process for performing a first color correction to an input color signal to obtain a target color chromatically equal to the input color and converting said target color into a first color density signal corresponding to said target color,
 a judgment process for judging whether or not the input color is reproducible by a printer having a color density,
 a second color correction process for performing a second color correction to said input color signal when judged in said judgment process that the input color is not reproducible by a printer, said second color correction converting said input color signal into a second color density signal which is visually nearest to said target color within a color gamut reproducible by the printer, said second color correction process including a color reproduction prediction process for predicting colors reproducible by the printer with respect to said target color, a calculation process for calculating evaluation values using at least one evaluation function for evaluating a chromatic relation between each of predicted colors and said target color, and a search process for seeking a best evaluation value among said evaluation values obtained in said calculation process to obtain said second color density signal based on the predicted color giving said best evaluation value, and
 a color formation process for forming color images while controlling the color density of the printer in accordance with said first color density signal when the input color is judged to be reproducible by the printer and said second color density signal when the input color is judged to be unreproducible by the printer.

2. The method for forming color images according to claim 1 in which the input color is judged to be unreproducible by the printer if one of color components of said first color density signal has a density out of a range defined by a minimum color density equal to that of a print sheet used for printing and a maximum color density reproducible by the printer.

3. The method for forming color image according to claim 1 in which the color density signal to be converted is the first color density signal and said prediction process is performed by inverse operation of the first color density signal to a color signal in a color space of said input color signal.

4. The method for forming color images according to claim 1 wherein a plurality of evaluation functions are provided and used selectively in accordance with color components of said input color signal.

5. The method for forming color images according to claim 4 wherein each of said plurality of evaluation functions $E(i)[i=1, \ldots, n: n=$ the total number of a evaluation functions] is given by an equation depicted as $$E(i)=\{(a_i\Delta L(i)^2+b_i\Delta H_{uv}(i)^2+c_i\Delta S_{uv}(i)^2)/(a(i)+b(i)+c(i))\}^{\frac{1}{2}}$$

wherein $a(i), b(i), c(i)$: weighing coefficients
$\Delta L(i) = L_0^* - L(i)^*$ $\Delta S_{uv} = S_0 - S(i)$
$\quad S_0 = (u_0^{*2} + v_0^{*2})^{\frac{1}{2}}$
$\quad S(i) = (u(i)^{*2} + v(i)^{*2})^{\frac{1}{2}}$ $\Delta H_{uv} = (S(i) + S_0) \cdot |\theta_0 - \theta(i)|/2$
$\quad \theta_0 = \tan^{-1}(v_0^*/u_0^*)$
$\quad \theta(i) = \tan^{-1}(v(i)^*/u(i)^*)$ $L_0^*, u_0^*, v_0^*$ coordinates of the target color in $L^*, u^*, v^*$ space;
$L(i)^*, u(i)^*, v(i)^*$ coordinates of the color to be reproduced.

6. The method for forming color images according to claim 1 wherein a plurality of neighborhood color density signals are calculated from input color signals near to a considered input color signal and the color density signal corresponding to the considered input color signal is corrected by a neighborhood calculation using said plurality of neighborhood color density signals whereby the color density of the printer is controlled by the color density signal corrected by said neighborhood calculation.

7. A color image forming apparatus for controlling a color printer which comprises a first correction means for performing a first color correction to an input color signal using upper bits of said input color signal to obtain a representative point of said input color signal and for converting said representative point of said input color signal into a first color density signal,
 a judgment means for judging whether or not said representative point of said input color signal is a color reproducible by a printer,
 a second color correction means for performing a second color correction to said representative point of said input color signal when judged by said judgment means that said representative point of said input color signal is not a color reproducible by the printer, said second color correction converting said representative point of said input color signal into a second color density signal which will reproduce a color visually nearest to said representative point of said input color signal within a color gamut reproducible by the printer,
 a memory means for storing said first and second color density signals,
 a memory control means for addressing said memory means using upper bit information of said input color signals and reading the stored color density signal from said memory means, and
 an interpolation means for performing an interpolation operation to said stored color density signals read from said memory means using lower bit information of said input color information to obtain a final color density signal in response to which the color printer performs color printing operation.

* * * * *